US006683614B2

(12) United States Patent
Walls et al.

(10) Patent No.: US 6,683,614 B2
(45) Date of Patent: Jan. 27, 2004

(54) SYSTEM AND METHOD FOR AUTOMATICALLY CONFIGURING GRAPHICS PIPELINES BY TRACKING A REGION OF INTEREST IN A COMPUTER GRAPHICAL DISPLAY SYSTEM

(75) Inventors: Jeffrey J. Walls, Fort Collins, CO (US); Donley B. Hoffman, Fort Collins, CO (US); Kevin T. Lefebvre, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 185 days.

(21) Appl. No.: 10/028,869

(22) Filed: Dec. 21, 2001

(65) Prior Publication Data

US 2003/0128216 A1 Jul. 10, 2003

(51) Int. Cl.[7] .................................................. G06T 1/20
(52) U.S. Cl. ........................................ 345/506; 709/105
(58) Field of Search ................................. 345/501, 502, 345/504–506, 530, 531, 532, 519, 556, 545; 709/100, 102, 103, 104, 105, 107

(56) References Cited

U.S. PATENT DOCUMENTS

| | | | | |
|---|---|---|---|---|
| 5,392,394 A | * | 2/1995 | Hamana | 345/504 |
| 5,394,524 A | * | 2/1995 | DiNicola et al. | 345/506 |
| 5,467,459 A | * | 11/1995 | Alexander et al. | 345/556 |
| 5,485,559 A | * | 1/1996 | Sakaibara et al. | 345/505 |
| 5,712,664 A | * | 1/1998 | Reddy | 345/519 |
| 5,757,385 A | | 5/1998 | Narayanaswami et al. | 345/505 |
| 5,794,016 A | | 8/1998 | Kelleher | 395/505 |
| 5,826,095 A | * | 10/1998 | Jordan | 712/11 |
| 5,940,086 A | | 8/1999 | Rentschler et al. | 345/503 |
| 6,067,097 A | | 5/2000 | Morita et al. | 345/505 |
| 6,249,294 B1 | | 6/2001 | Lefebvre et al. | 345/504 |
| 6,570,571 B1 | * | 5/2003 | Morozumi | 345/505 |

OTHER PUBLICATIONS

Humphreys, Greg, el al., "WireGL: A Scalable Graphics System for Clusters", ACM Siggraph 2001. Aug. 2001, 12 pages.
Lefebvre, Kevin T, Whitepaper entitled, "HP Visualization Center SV6", Hew lett–Packard Company, May, 2001, 10 pages.

* cited by examiner

Primary Examiner—Kee M. Tung

(57) ABSTRACT

A system and method for automatically configuring graphics pipelines by tracking a region of interest in a computer graphical display system is disclosed. The method comprises receiving updated definitional information on a selected region of interest of a display device of the computer graphical display system in response to a change in definition of the selected region of interest and automatically configuring the plurality of graphics pipelines relative to the selected region of interest based at least in part on the updated definitional information.

41 Claims, 11 Drawing Sheets

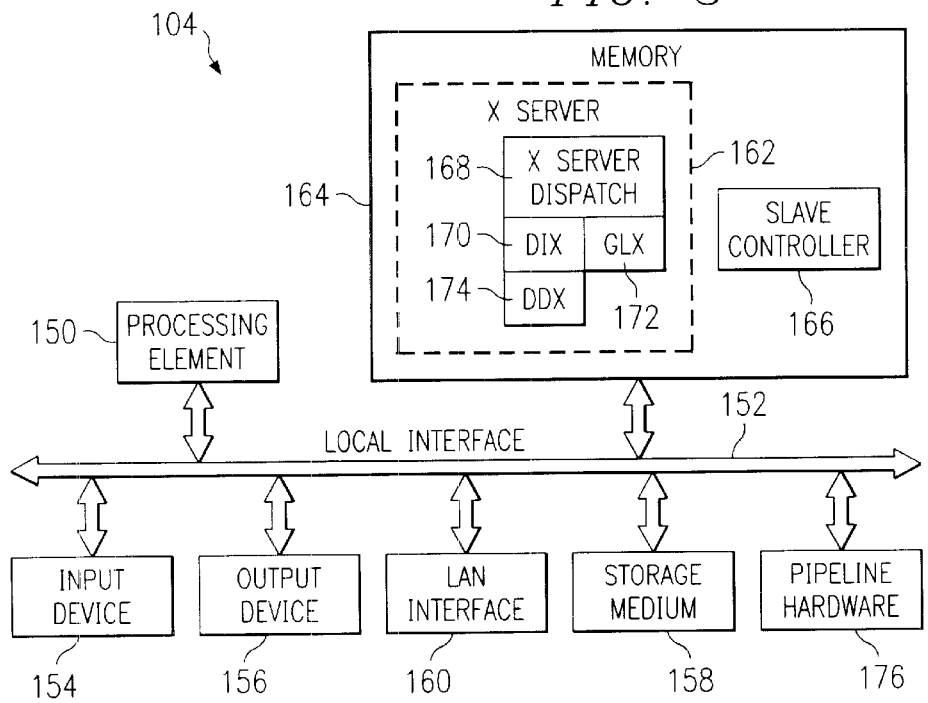
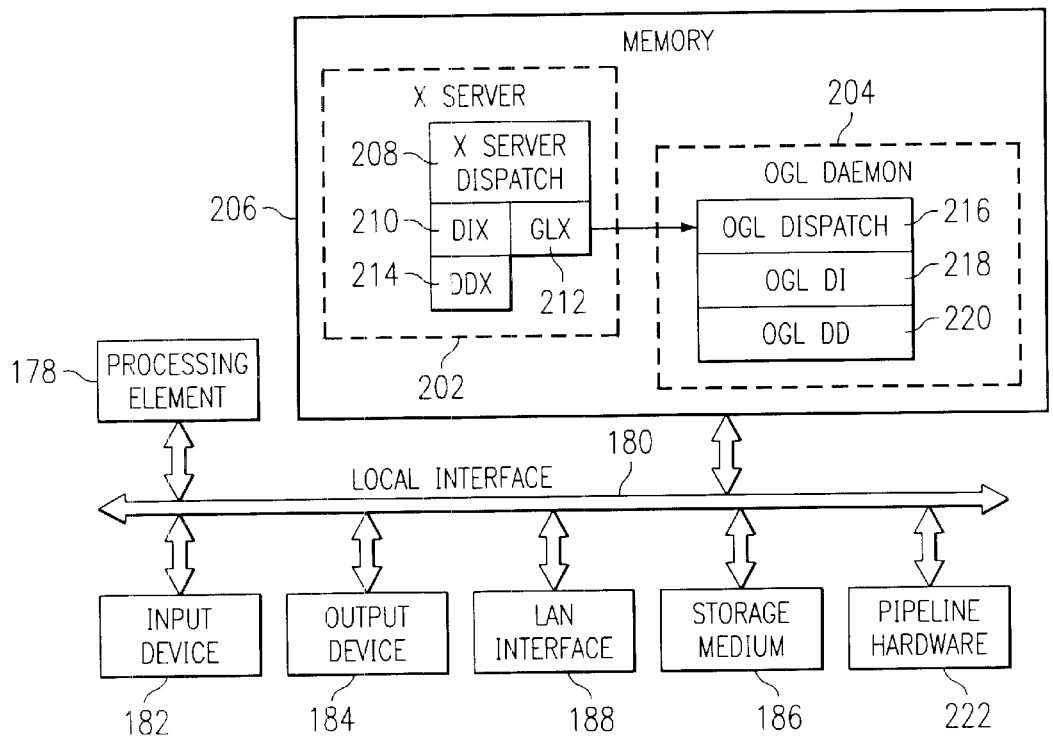

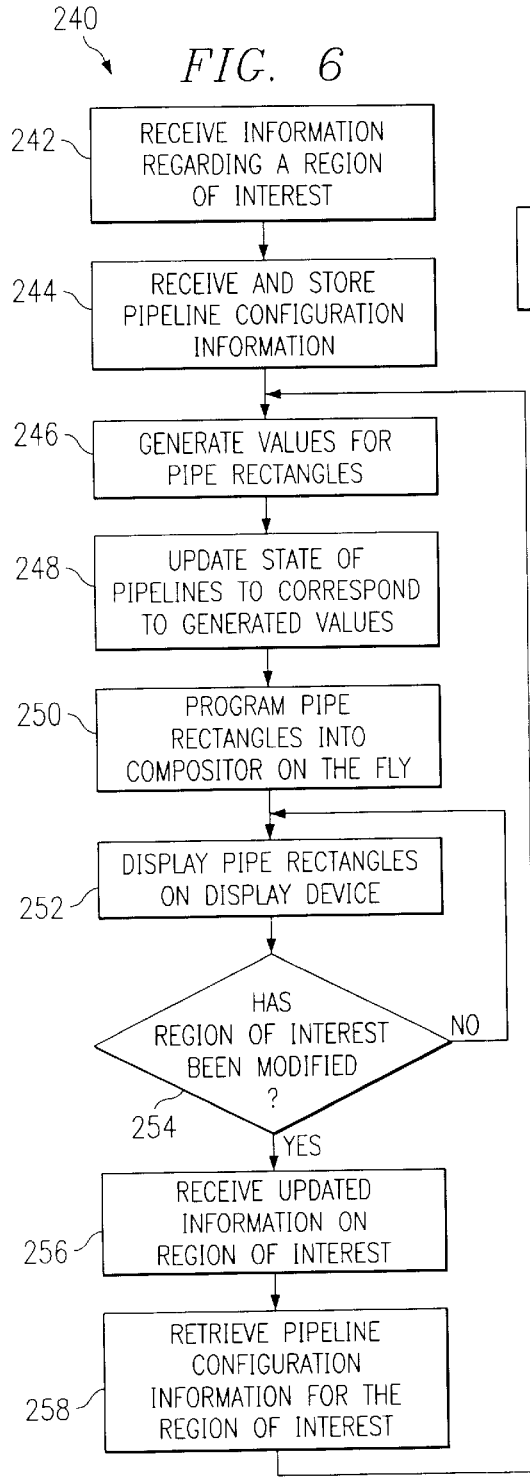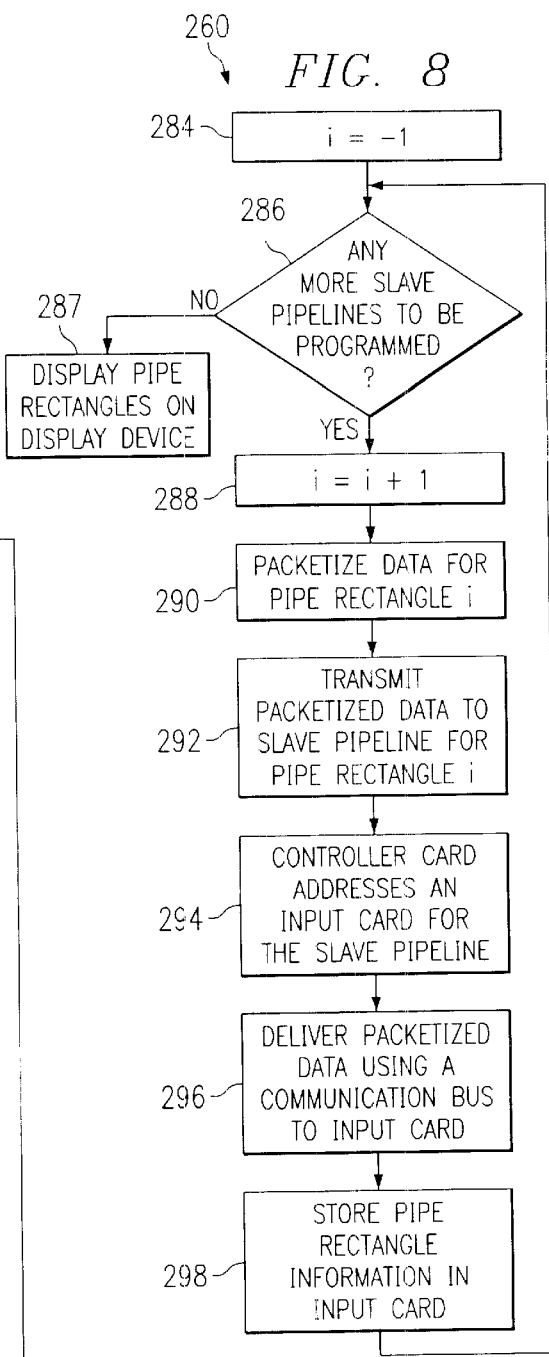

SYSTEM AND METHOD FOR AUTOMATICALLY CONFIGURING GRAPHICS PIPELINES BY TRACKING A REGION OF INTEREST IN A COMPUTER GRAPHICAL DISPLAY SYSTEM

CROSS-REFERENCE TO RELATED APPLICATIONS

This patent application is related to co-pending and commonly assigned U.S. patent application Ser. No. 09/715,746, entitled "SINGLE LOGICAL SCREEN SYSTEM AND METHOD FOR RENDERING GRAPHICAL DATA," filed on Nov. 17, 2000; U.S. patent application Ser. No. 09/715,892, entitled "SYSTEMS FOR COMPOSITING GRAPHICAL DATA," filed on Nov. 17, 2000; U.S. patent application Ser. No. 09/715,335, entitled "SYSTEM AND METHOD FOR EFFICIENTLY RENDERING GRAPHICAL DATA," filed on Nov. 17, 2000; U.S. patent application Ser. No. 09/715,253, entitled "SYSTEM AND METHOD FOR EFFICIENTLY RENDERING A JITTER ENHANCED GRAPHICAL IMAGE," filed on Nov. 17, 2000; U.S. patent application. Ser. No. 09/715,882, entitled "SYSTEMS AND METHODS FOR RENDERING GRAPHICAL DATA," filed on Nov. 17, 2000; and concurrently filed U.S. patent application Ser. No. 10/028,868, entitled "SYSTEM AND METHOD FOR CONFIGURING GRAPHICS PIPELINES IN A COMPUTER GRAPHICAL DISPLAY SYSTEM."

TECHNICAL FIELD OF THE INVENTION

The present invention relates generally to the field of computer graphical display systems, and more particularly to a system and method for automatically configuring graphics pipelines by tracking a region of interest in a computer graphical display system.

BACKGROUND OF THE INVENTION

Computer graphical display systems are commonly used for displaying graphical representations of two-dimensional and/or three-dimensional objects on a two-dimensional display device, such as a cathode ray tube.

In existing computer graphical display systems, a graphics application stored on a processor-based system, such as a computer, defines an object to be rendered by the computer graphical display system. In order to render the object, the graphics application transmits graphics data defining the object to a graphics pipeline, which may be implemented in hardware, software, or a combination thereof. The graphics pipeline via well-known techniques processes the graphics data received from the application and stores the graphics data in a frame buffer. The frame buffer stores the graphics data to define the image to be displayed by the display device. The frame buffer is used to store a set of data for each pixel displayed by the display device. Each set of data includes the color value of the corresponding pixel as well as any additional information needed to appropriately color or shade the identified pixel, such as transparency and depth values. Each set of data is correlated with the coordinate values that identify a pixel position on the display device. The frame buffer transmits the graphics data stored therein to the display device via a scanning process such that each line of pixels defining the image displayed by the display device is consecutively updated.

Multiple display devices may be used to display a single large image in which each display device displays a portion of the large image. In such an embodiment, the multiple display devices are treated as a single logical display device or screen in which different portions of the image may be displayed by the different display devices. Each of the multiple display devices may be associated with different computer systems and the multiple computer systems may be interconnected via a computer network, such as a Local Area Network (LAN). An X Window System is a standard for implementing window-based user interfaces in a networked computer environment and it may be desirable to utilize X Protocol in rendering graphics data in the networked computer system. A more detailed discussion of the X Window System and the X Protocol that defines it may be found in X Protocol Reference Manual Volume Zero (O'Riley & Associates 1990) by Adrian Nye.

Although it is possible to render and display two-dimensional and three-dimensional data in conventional computer graphical display systems, there exists limitations that restrict the performance and image quality exhibited by such systems. High quality images, particularly three-dimensional images, are typically defined by a large amount of graphics data and the speed at which conventional graphics pipelines can process the graphics data defining an object is limited. The above-referenced patent application, entitled "SYSTEM AND METHOD FOR EFFICIENTLY RENDERING GRAPHICAL DATA" describes a computer graphical display system and method for efficiently utilizing a plurality of graphics pipelines to render graphics data for a display device. The above-referenced patent application, entitled "SYSTEM AND METHOD FOR CONFIGURING GRAPHICS PIPELINES IN A COMPUTER GRAPHICAL DISPLAY SYSTEM" describes a system and method for configuring graphics pipelines in a computer graphical display system.

In computer graphical display systems, if a region of interest, for example a window, is moved or resized and the user desires to keep the configuration of the graphics pipelines with regard to the new region of interest the same as the old region of interest, the user would have to re-configure the graphics pipelines based on a visual inspection of the new region of interest. Moreover, in such graphical display systems, the graphics pipelines may take different amounts of time to render the graphics data. Consequently, a graphics pipeline that takes longer to render the graphics data may effect the overall performance of the computer graphical display system.

SUMMARY OF THE INVENTION

In accordance with an embodiment of the present invention, a method for automatically configuring a plurality of graphics pipelines in a computer graphical display system is disclosed. The method comprises receiving updated definitional information on a selected region of interest of a display device of the computer graphical display system in response to a change in definition of the selected region of interest and automatically configuring the plurality of graphics pipelines relative to the selected region of interest based at least in part on the updated definitional information.

In accordance with another embodiment of the present invention, a system for automatically configuring a plurality of graphics pipelines in a computer graphical display system is disclosed. The system comprises means for receiving updated definitional information on a selected region of interest of a display device of the computer graphical display system in response to a change in definition of the selected region of interest. The system also comprises means for automatically configuring the plurality of graphics pipelines relative to the selected region of interest based at least in part on the updated definitional information.

In accordance with yet another embodiment of the present invention, a method for dynamic load-balancing of a plurality of graphics pipelines in a computer graphical display system is disclosed. The method comprises analyzing the time taken by each of the plurality of graphics pipelines to render their respective portions of a graphics image and automatically adjusting the respective portions of the graphics image of the plurality of graphics pipelines based at least in part on the analysis of the time taken by each of the plurality of graphics pipelines to render the respective portions of the graphics image.

In accordance with yet another embodiment of the present invention, a system for dynamic load-balancing of a plurality of graphics pipelines in a computer graphical display system is disclosed. The system comprises means for analyzing the time taken by each of the plurality of graphics pipelines to render their respective portions of a graphics image. The system also comprises means for automatically adjusting the respective portions of the graphics image of the plurality of graphics pipelines based at least in part on the analysis of the time taken by each of the plurality of graphics pipelines to render the respective portions of the graphics image.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is a block diagram of a more detailed view of a master pipeline depicted in FIG. 1;

FIG. 4 is a block diagram of a more detailed view of a slave pipeline depicted in FIG. 1;

FIG. 6 is a flowchart of a method for automatically configuring pipelines by tracking a region of interest in a computer graphical display system in accordance with an embodiment of the present invention;

FIG. 8 is a flowchart of a method for programming pipe rectangles into a compositor of the computer graphical display system in accordance with an embodiment of the present invention;

DETAILED DESCRIPTION OF THE DRAWINGS

The preferred embodiment of the present invention and its advantages are best understood by referring to FIGS. 1 through 12 of the drawings, like numerals being used for like and corresponding parts of the various drawings.

There is a desire for a system and method for automatically configuring graphics pipelines by tracking a region of interest in a computer graphical display system. In a preferred embodiment this is accomplished by selecting a region of interest, for example a window, in the graphical display system and configuring the graphics pipelines relative to the selected window. When the window is modified, for example when the user resizes or moves the window, the configuration of the graphics pipelines is automatically changed to correspond to the modified window.

Figure 1:
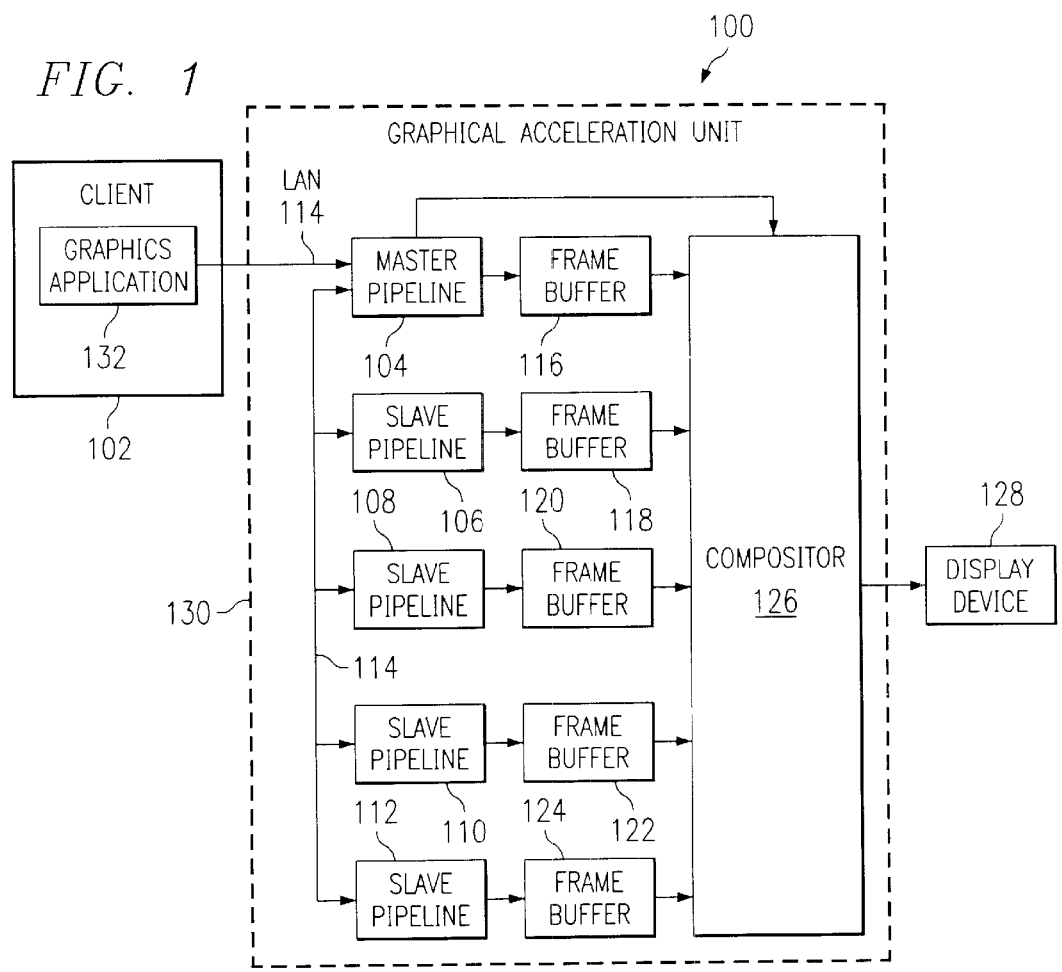
FIG. 1 is a block diagram of an exemplary embodiment of a computer graphical display system on which the teachings of the present invention may be practiced.

FIG. 1 is a block diagram of an exemplary embodiment of a graphical display system 100 on which the teachings of the present invention may be practiced. System 100 comprises a client 102 coupled to master pipeline 104, which is coupled to slave pipelines 106–112, preferably via a Local Area Network (LAN) 114. The terms "pipelines" and "graphics pipelines" are used interchangeably herein. However, other types of interconnection circuitry or computer networks may be utilized without departing from the scope of the present invention. System 100 also preferably comprises one or more frame buffers 116–124 coupled between respective ones of the pipelines 104–112 and a compositor 126. Preferably, master pipeline 104 is also coupled to compositor 126. Compositor 126 is coupled to a display device 128. Pipelines 104–112, frame buffers 116–124, and compositor 126 are collectively referred to herein as a graphical acceleration unit 130. It should be noted that the embodiment shown in FIG. 1 depicts four slave pipelines 106–112 for illustrative purposes only. Any number of slave pipelines 106–112 may be employed without departing from the scope of the present invention.

Client 102 comprises a graphics application 132 and may be implemented in hardware, software or any combination thereof. Pipelines 104–112 may be implemented in hardware, software or any combination thereof. In the preferred embodiment, client 102 and each of the pipelines 104–112 are respectively implemented via computer systems. Such computer systems may be stand alone computer systems, for example computer systems commonly referred to as "computer workstations." However, the invention is not so limited and other types of computer systems, now known or later developed, may be used. Thus, for example, system 100 as shown in FIG. 1 may be implemented via six computer workstations (i.e., one computer workstation for client 102 and one computer workstation for each of the pipelines 104–112). However, it is possible to implement client 102 and pipelines 104–112 using other configurations. As an example, client 102 and master pipeline 104 may be implemented via a single computer workstation. Any computer workstation used to implement client 102 and/or pipelines 104–112 may be utilized to perform other desired functionality when the workstation is not being used to render graphics data.

In operation, master pipeline 104 receives graphics data from application 132. Master pipeline 104 preferably renders two-dimensional (2D) graphics data to frame buffer 116 and routes three-dimensional (3D) graphics data to slave pipelines 106–112, which render the 3D graphics data to frame buffers 118–124, respectively. Client 102 and pipelines 104–112 are described in more detail hereinafter.

Each frame buffer 116–124 outputs a stream of graphics data to compositor 126. Compositor 126 is configured to combine or composite each of the data streams from frame buffers 116–124 into a single data stream that is provided to display device 128, which may be a Cathode Ray Tube (CRT), a Liquid Crystal Display (LCD), a Thin Film Transistor (TFT), a Light Emitting Diode (LED), organic polymers and/or the like now known or later developed. Although in FIG. 1, display device 128 is shown as a single display device, the invention is not so limited and in alternative embodiments, display device 128 may comprise more than one display device acting as a single logical display device. In such an embodiment, each display device may be coupled to a separate graphical acceleration unit, each graphical acceleration unit being coupled to the same client.

Referring to FIG. 1, the graphics data provided to display device 128 by compositor 126 defines the image to be displayed by display device 128 and is based on the graphics data received from frame buffers 116–124. Compositor 126 is described in more detail hereinafter.

Figure 2:
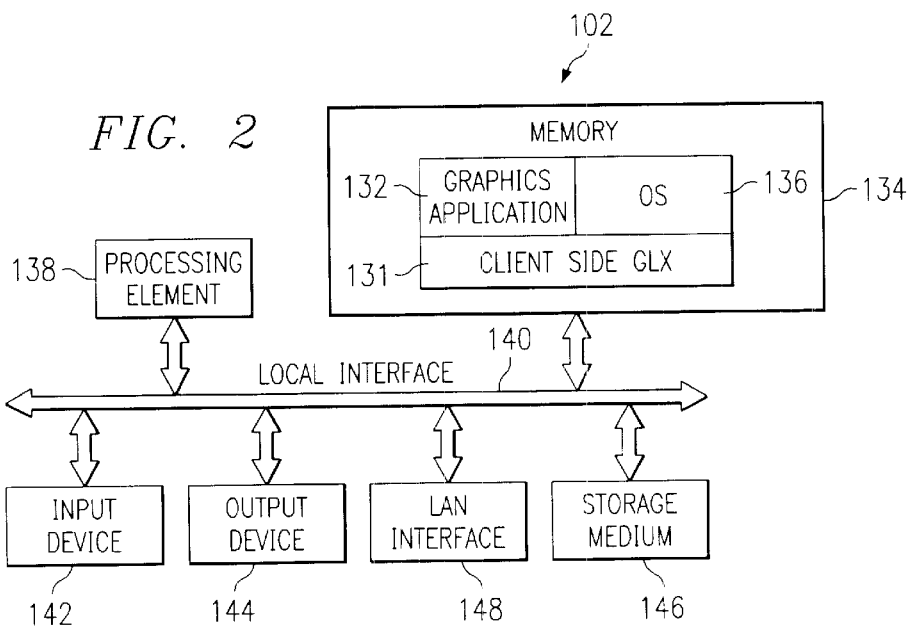
FIG. 2 is a block diagram of a more detailed view of a client depicted in FIG. 1.

FIG. 2 is a block diagram of a more detailed view of client 102. Client 102 preferably stores graphics application 132 in memory 134. Memory 134 may also store an operating system 136, which performs functionality similar to conventional operating systems. Operating system 136 controls the resources of client 102 through conventional techniques and interfaces the instructions of application 132 with a processing element 138 as necessary to enable application 132 to properly run. Processing element 138 preferably communicates with and drives other elements within client 102 via a local interface 140, which may include one or more buses. Client 102 may also comprise at least one input device 142, for example, a keyboard, a mouse, and/or the like, now known or later developed, coupled to local interface 140 to input data from a user of client 102. Client 102 may also comprise at least one output device 144, for example, a display device, a printer, and/or the like, now known or later developed, coupled to local interface 140 to output data. Client 102 may also comprise a storage medium 146 to store data. Storage medium 146 may be any storage medium now known or later developed. Storage medium 146 may be coupled to local interface 140 to transfer data to and from the storage medium. A LAN interface 148 coupled to local interface 140 may be provided to allow client 102 to exchange data with LAN 114 (FIG. 1).

In the preferred embodiment, X Protocol is generally utilized to render 2D graphics data, and OpenGL Protocol (OGL) is generally utilized to render 3D graphics data, although other types of protocols may be utilized in other embodiments. By way of background, OpenGL Protocol is a standard application programmer's interface (API) to hardware that accelerates 3D graphics operations. Although OpenGL Protocol is designed to be window system independent, it is often used with window systems, such as the X Window System, for example. In order that OpenGL Protocol may be used in an X Window System environment, an extension of the X Window System has been developed called GLX. For more complete information on the GLX extension to the X Window System and on how OpenGL Protocol can be integrated with the X Window System, see for example Mark J. Kilgard, OpenGL Programming for the X Window System (Addison-Wesley Developers Press 1996). Memory 134 comprises a client side GLX layer 131. When application 132 issues a graphical command, client side GLX layer 131 of client 102 transmits the command over LAN 114 to master pipeline 104.

FIG. 3 is a block diagram of a more detailed view of master pipeline 104. Master pipeline 104 comprises one or more processing elements 150 coupled to a local interface 152, which may include one or more buses. Processing element 150 preferably communicates with and drives other elements within master pipeline 104 via a local interface 152, which may include one or more buses. Master pipeline 104 may also comprise at least one input device 154, for example, a keyboard, a mouse, and/or the like, now known or later developed, coupled to local interface 152 to input data. Master pipeline 104 may also comprise at least one output device 156, for example, a display device, a printer, and/or the like, now known or later developed, coupled to local interface 152 to output data. Master pipeline 104 may also comprise a storage medium 158 to store data. Storage medium 158 may be any storage medium now known or later developed. Storage medium 158 may be coupled to local interface 152 to transfer data to and from the storage medium. LAN interface 160 coupled to local interface 152 may be provided to allow master pipeline 104 to exchange data with LAN 114.

Master pipeline 104 preferably also comprises memory 164. Memory 164 comprises an X server 162 and a slave controller 166. X server 162 may be implemented in software, hardware, or a combination thereof. In the embodiment shown in FIG. 3, X server 162 is implemented in software.

X server 162 comprises an X server dispatch layer 168, a device independent layer (DIX) 170, a GLX layer 172 and a device dependent layer (DDX) 174. In the preferred embodiment, X server 162 renders 2D X window commands, such as commands to create or move an X window. X server dispatch layer 168 is designed to route received commands to DIX layer 170 or to GLX layer 172. An X window command that does not include 3D data is interfaced with DIX, whereas an X window command that includes 3D data (e.g., an X command having embedded OpenGL Protocol, such as a command to create or change the state of a 3D image within an X window) is routed to GLX layer 172. A command interfaced with DIX layer 170 is executed by the DIX layer 170 and potentially by DDX layer 174, which drives graphics data associated with the executed command through a pipeline hardware 176 to frame buffer 116. A command interfaced with GLX layer 172 is transmitted by GLX layer 172 across LAN 114 to slave pipelines 106–112. One or more of the slave pipelines 106–112 executes the command and drives graphics data associated with the command to one or more frame buffers 118–124.

In the preferred embodiment, each of the slave pipelines 106–112 is configured according to FIG. 4. Each of the slave pipelines 106–112 comprises one or more processing elements 178 coupled to a local interface 180, which may include one or more buses. Processing element 178 preferably communicates with and drives other elements within slave pipeline 106–112 via a local interface 180 which may include one or more buses. Each slave pipeline 106–112 may also comprise at least one input device 182, for example, a keyboard, a mouse, and/or the like, now known or later developed, coupled to local interface 180 to input data. Each slave pipeline 106–112 may also comprise at least one output device 184, for example, a display device, a printer, and/or the like, now known or later developed, coupled to local interface 180 to output data. Each slave pipeline 106–112 may also comprise a storage medium 186 to store data. Storage medium 186 may be any storage medium now known or later developed. Storage medium 186 may be coupled to local interface 180 to transfer data to and from the storage medium. A LAN interface 188 coupled to local interface 180 may be provided to allow slave pipelines 106–112 to exchange data with LAN 114.

Each slave pipeline 106–112 preferably also comprises memory 206. Memory 206 comprises an X server 202 and an OGL Daemon 204. X server 202 and OGL daemon 204 may be implemented in software, hardware, or a combination thereof. In the embodiment shown in FIG. 4, X server 202 and OGL daemon 204 are implemented in software.

X server 202 comprises an X server dispatch layer 208, a device independent layer (DIX) 210, a GLX layer 212, and a device dependent layer (DDX) 214. OGL daemon 204 preferably comprises an OGL dispatch layer 216, an OGL Device Independent (DI) layer 218 and an OGL Device Dependent (DD) layer 220.

In the preferred embodiment, each command received by slave pipelines 106–112 includes 3D graphics data, since X server 162 of master pipeline 104 executes each X window command that does not include 3D graphics data. X server dispatch layer 208 interfaces the 2D data of any received commands with DIX layer 210 and interfaces the 3D data of any received commands with GLX layer 212. DIX and DDX layers 210 and 214 are configured to process or accelerate the 2D data and to drive the 2D data through pipeline hardware 176 to one of the frame buffers 118–124 (FIG. 1).

GLX layer 212 interfaces the 3D data with OGL dispatch layer 216 of the OGL daemon 204. OGL dispatch layer 216 interfaces this data with OGL DI layer 218. OGL DI layer 218 and DD layer 220 are configured to process the 3D data and to accelerate or drive the 3D data through pipeline hardware 222 to one of the frame buffers 118–124 (FIG. 1). Thus, the 2D graphics data of a received command is processed or accelerated by X server 202, and the 3D graphics data of the received command is processed or accelerated by OGL daemon 204. For a more detailed description of the foregoing process of accelerating 2D data via an X server 202 and of accelerating 3D data via an OGL daemon 204, refer to commonly-assigned U.S. Pat. No. 6,249,294, entitled "3D GRAPHICS IN A SINGLE LOGICAL SCREEN DISPLAY USING MULTIPLE COMPUTER SYSTEMS".

Referring again to FIG. 1, slave pipelines 106–112, based on inputs from master pipeline 104, are configured to render 3D images based on the graphics data from master pipeline 104 according to one of three modes of operation: accelerate mode, jitter mode and mixed mode. Each slave pipeline 106–112 is responsible for rendering a specific portion of the image to be displayed on display device 128. Thus, the screen associated with display device 128 is divided into different pipe portions, the image for each pipe portion being rendered by at least one of slave pipelines 106–112. The pipe portions are preferably rectangular in shape and as such the term pipe rectangles will be used herein to refer to pipe portions. However, the invention is not so limited and the pipe portions may be of any shape.

In the accelerate mode, each slave pipeline 106–112 renders a different portion of a 3D image such that the overall process of rendering the 3D image is faster. In the jitter mode, each slave pipeline 106–112 renders the same 3D image but slightly offsets each rendered 3D image with a different offset value. Compositor 126 averages the pixel data of each pixel for the 3D images rendered by pipelines 106–112 in order to produce a single 3D image of increased image quality. In the mixed mode, one or more of the slave pipelines render the same portion(s) of the 3D image but slightly offset the common portion(s) with a different offset value. In the mixed mode, the overall process of rendering the 3D image is faster than in the jitter mode because the work of rendering is divided among multiple pipelines. The image quality of at least a portion of the rendered 3D image is better than the image quality in the accelerate mode because jittering is used.

Figure 5A:
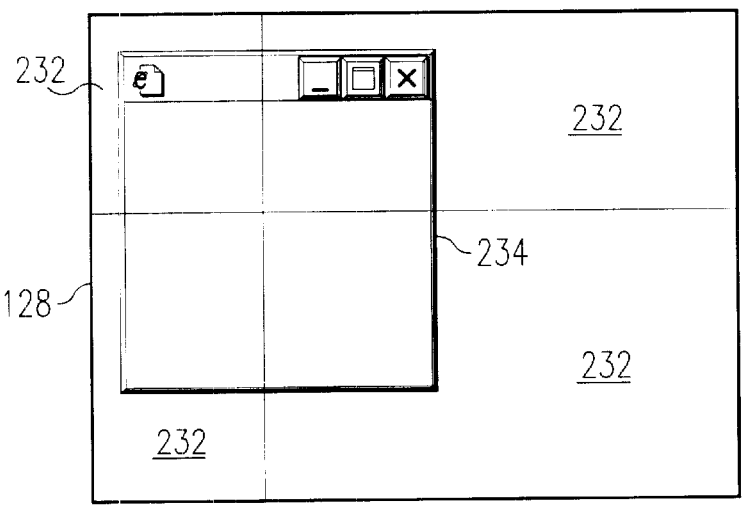
FIGS. 5A–5C are exemplary screen displays of a computer graphical display system utilizing the teachings of the present invention.
Figure 5B:
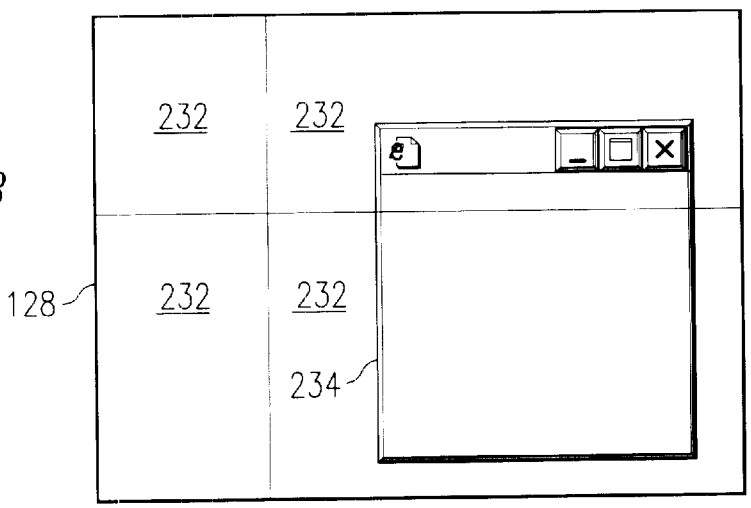
Figure 5C:
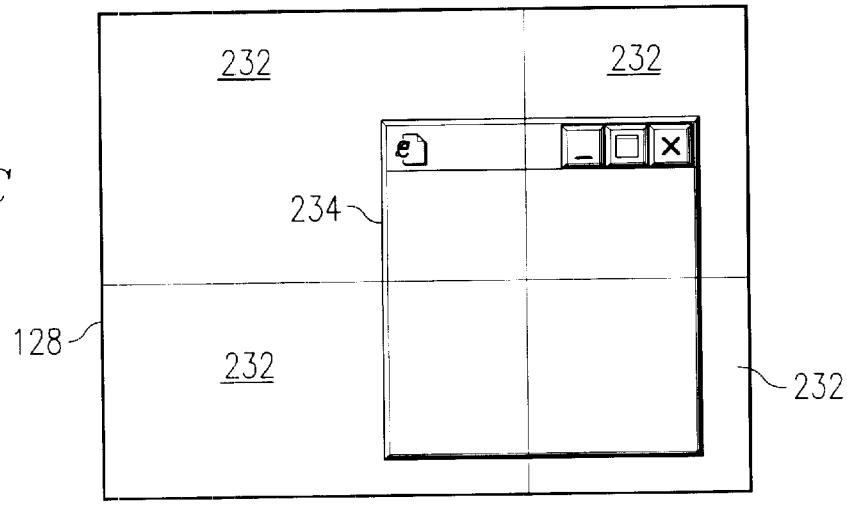
Figure 7A:
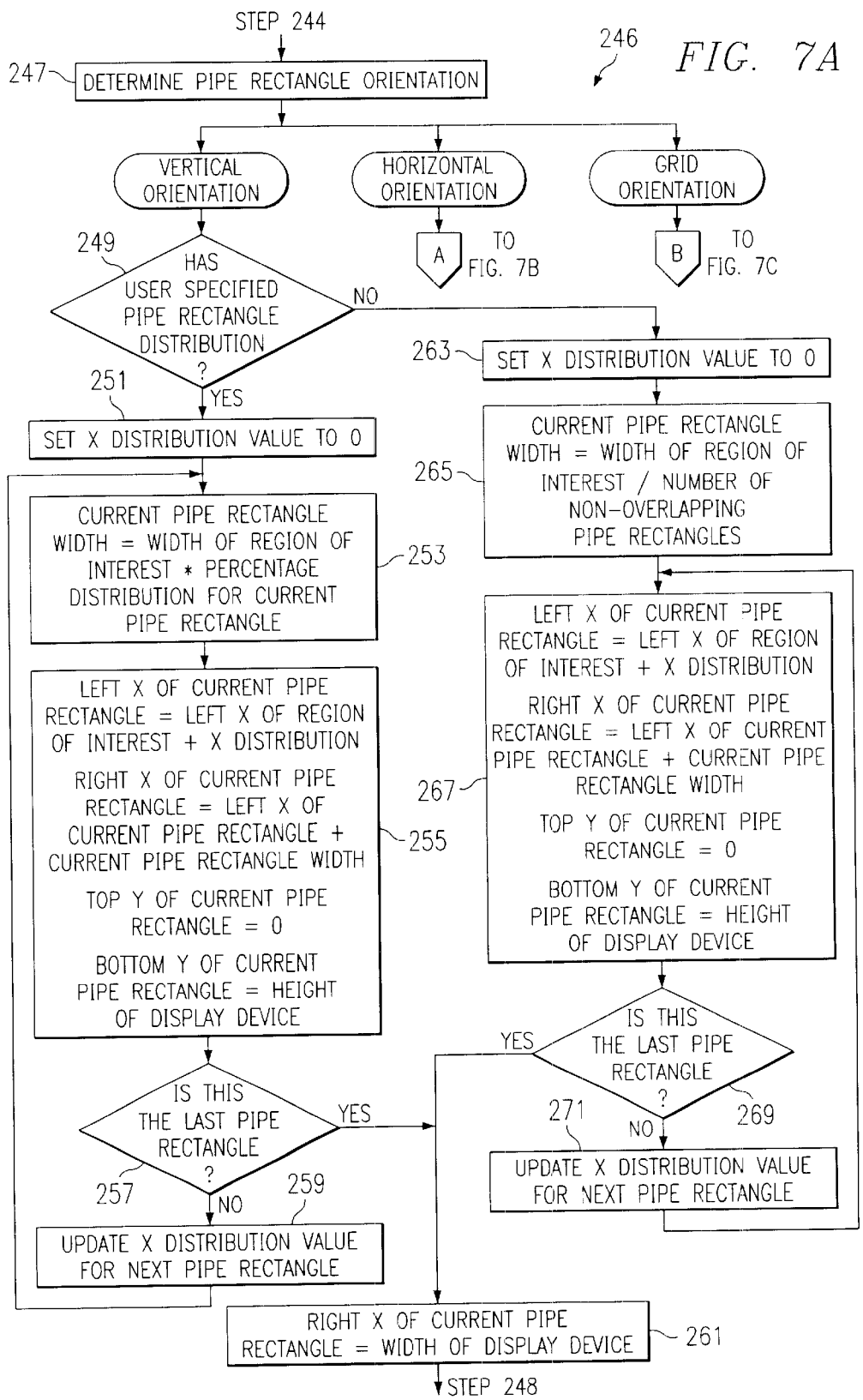
FIGS. 7A–7D are flowcharts of a method for generating values for pipe rectangles in accordance with an embodiment of the present invention.
Figure 7B:
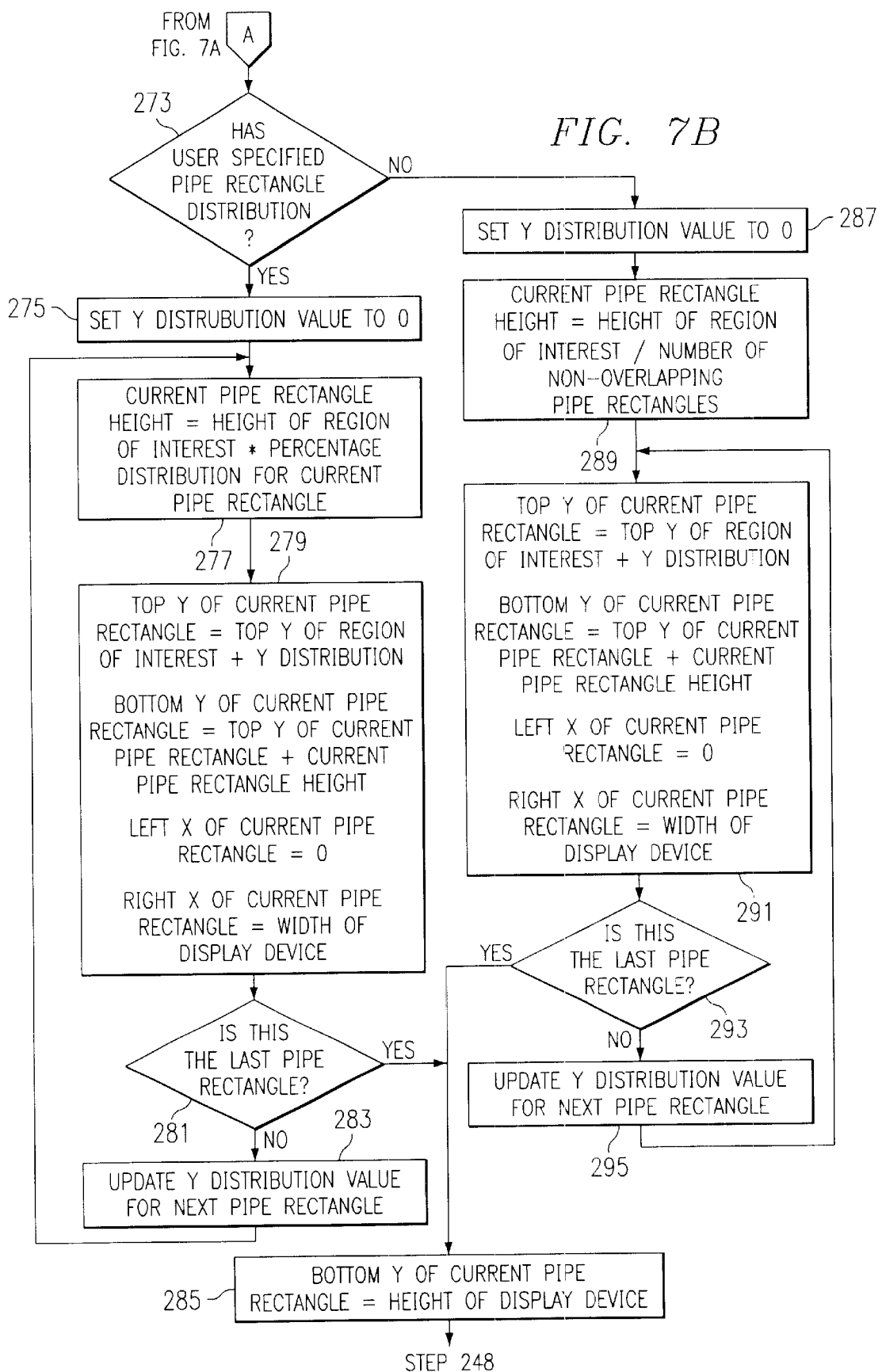
Figure 7C:
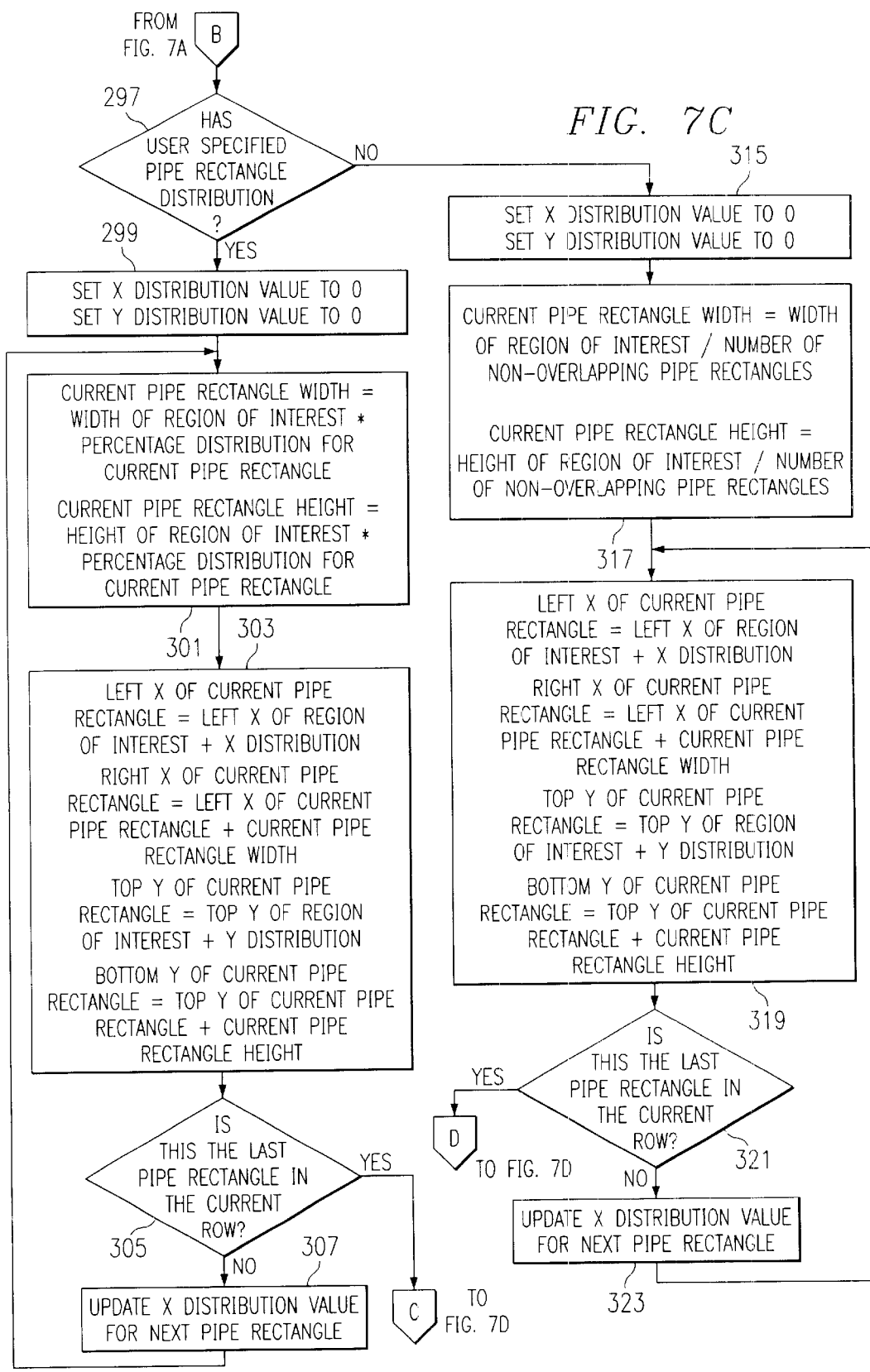
Figure 7D:
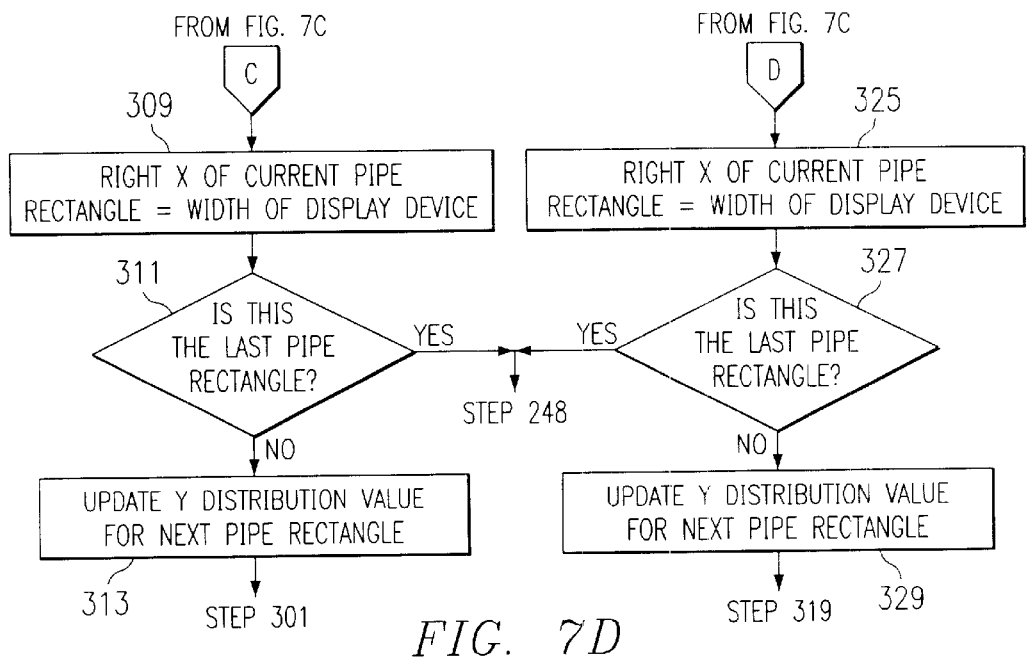

FIGS. 5A–5C are exemplary screen displays of display device 128 of computer graphical display system 100 (FIG. 1). As shown, each of the exemplary screen displays comprises a region of interest 234. Region of interest 234 is preferably a window. However, the invention is not so limited and region of interest 234 may be any region of display device 128. Furthermore, region of interest 234 may be of any shape. The terms region of interest and window are used interchangeably herein. Utilizing the system and method of the above referenced U.S. patent application, entitled "SYSTEM AND METHOD FOR CONFIGURING GRAPHICS PIPELINES IN A COMPUTER GRAPHICAL DISPLAY SYSTEM" the user may configure slave graphics pipelines 106–112 (FIG. 1) and display a plurality of pipe rectangles 232 associated with slave pipelines 106–112. However, the invention is not so limited and any system and/or method may be used to configure slave pipelines 106–112 and display pipe rectangles 232.

In FIG. 5A, pipe rectangles 232 are substantially evenly distributed relative to window 234. However, if window 234 is subsequently modified, for example by the user moving window 234 to a new position, as shown for example in FIG. 5B, or resizing window 234, pipe rectangles 232 are no longer substantially evenly distributed relative to window 234. Utilizing the system and method of the present invention, upon modification of window 234, slave pipelines 106–112 may be automatically reconfigured and pipe rectangles 232 may be automatically displayed, as shown for example in FIG. 5C, such that pipe rectangles 232 are again substantially evenly distributed relative to window 234.

FIG. 6 is a flowchart 240 of a method for automatically configuring pipelines by tracking region of interest 234 in computer graphical display system 100 in accordance with an embodiment of the present invention. In step 242, information regarding region of interest 234 is received, preferably from the user and preferably by GLX layer 172. Preferably, the received information is definitional information regarding region of interest 234. The user may select window 234 on display device 128 and specify it to be the region of interest. The received definitional information about region of interest 234 indicates the location and dimensions of region of interest 234 with respect to display device 128. Location information comprises co-ordinate values for region of interest 234 with respect to display device 128. The dimensions of region of interest 234 may be expressed in terms of the number of pixels it covers along its width and the number of pixels it covers along its height on display device 128.

In step 244, input is received, preferably from the user and preferably by GLX layer 172, regarding the desired configuration of pipelines 106–112, e.g., orientation of pipe rectangles 232, distribution of pipe rectangles 232, jitter values, and/or the like. Preferably, the configuration information is provided by the user and is specified relative to window 234. For example, for a graphical display system with four slave pipelines using a grid orientation with each of the pipelines 106–112 operating in the accelerate mode, an X distribution may be 30% and 70% of window 234 and a Y distribution may be 20% and 80% of window 234. The received configuration information is preferably stored in disk 146.

In step 246, values for pipe rectangles 232 are generated, preferably by GLX layer 172, based at least in part on the received configuration information and in part on information regarding region of interest 234. A method for generating values for pipe rectangles is described in more detail herein especially with reference to FIGS. 7A–7D.

In step 248, the state of the pipelines is updated to correspond to the generated pipe rectangle values. The pipelines may already be operating with preset default values, for example vertical orientation with even distribution. In step 248, GLX layer 172 updates the state of each of the pipelines with the generated pipe rectangle values indicating the orientation and distribution for the respective pipelines.

In step 250, the pipe rectangles are programmed into compositor 126, preferably on the fly. GLX layer 172 converts the pipe rectangle data into a format suitable for X server 162. GLX layer 172 then transmits the pipe rectangle data to X server 162. X server 162 preferably programs compositor 126 so that compositor 126 is aware of the pipe rectangles associated with the different pipelines. A system and method for programming the pipe rectangles into compositor 126 is described in more detail herein especially with reference to FIG. 8.

In step 252, pipe rectangles, for example pipe rectangles 232, with the respective pipe rectangle boundary indicators are displayed on display device 128. The pipe rectangles are displayed on display device 128 preferably by X server 162. A system for displaying the pipe rectangles on display device 128 is described in more detail herein especially with reference to FIG. 9.

In step 254, a determination is made as to whether window 234 has been modified, for example by the user resizing the window or moving the window to a new location on display device 128. If window 234 has not been modified, then the process starting at step 252 may be repeated.

X server 162 preferably keeps tracks of all graphical resources in system 100, such as window 234. With regard to window 234, X server 162 keeps track of its location, its dimensions, and/or the like. When the user desires to modify window 234, for example by resizing or moving it, X server 162 performs the modifications. When X server 162 detects that window 234 has been modified, it provides updated window information, such as updated window definitional information, for example, the location, dimensions, and/or the like, regarding window 234 to GLX layer 172 (step 256). In step 258, configuration information relative to window 234 for pipelines 106–112 is retrieved from disk 146, preferably by GLX layer 172. The process starting at step 246 may then be repeated to automatically configure pipelines 106–112 relative to window 234.

FIGS. 7A–7D are flowcharts 246 of a method for generating values for pipe rectangles in accordance with an embodiment of the present invention. Each pipe rectangle is preferably defined by 4 pairs of coordinate values generically denoted as (left X, top Y), (right X, top Y), (left X, bottom Y) and (right X, bottom Y). In step 247, the orientation of the pipe rectangles specified by the user is determined.

If the determined orientation of the pipe rectangles is Vertical, then the process starting at step 249 is executed. In step 249, a determination is made as to whether the user has specified a distribution for the pipe rectangles. If the user has specified a distribution for the pipe rectangles, then in step 251, an X distribution value is set to zero. In step 253, a current pipe rectangle width parameter is set. Preferably, the current pipe rectangle width parameter is calculated using the following formula:

Current pipe rectangle width=width of region of interest*percentage distribution for current pipe rectangle.

In step 255, coordinate values for the current pipe rectangle are calculated. The coordinate values are preferably calculated using the following formulas:

Left $X$ of current pipe rectangle=Left $X$ of region of interest+$X$ distribution, for all pipe rectangles other than the first pipe rectangle;

Left X of current pipe rectangle=0, if the current pipe rectangle is the first pipe rectangle;

Right $X$ of current pipe rectangle=Left $X$ of current pipe rectangle+current pipe rectangle width;

Top Y of current pipe rectangle=0; and

Bottom Y of current pipe rectangle=height of display device 128.

In step 257, a determination is made as to whether the current pipe rectangle is the last pipe rectangle. If the current pipe rectangle is not the last pipe rectangle then in step 259, the X distribution value is updated for use in generating coordinate values for the next pipe rectangle. Preferably, the X distribution value is incremented by the current pipe rectangle width. The process starting at step 253 is then executed for the next pipe rectangle.

If in step 257, it is determined that the current pipe rectangle is the last pipe rectangle, then in step 261 the right X value for the current pipe rectangle is modified to be equal to the width of display device 128. The process starting at step 248 is then executed.

If in step 249, it is determined that the user has not specified a distribution for the pipe rectangles, then in step 263, an X distribution value is set to zero. In step 265, a current pipe rectangle width parameter is set. Preferably, the current pipe rectangle width parameter is calculated using the following formula:

Current pipe rectangle width=width of region of interest/number of non-overlapping pipe rectangles.

In step 267, coordinate values for the current pipe rectangle are calculated. The coordinate values are preferably calculated using the following formulas:

Left $X$ of current pipe rectangle=Left $X$ of region of interest+$X$ distribution, for all pipe rectangles other than the first pipe rectangle;

Left X of current pipe rectangle=0, if the current pipe rectangle is the first pipe rectangle;

Right $X$ of current pipe rectangle=Left $X$ of current pipe rectangle+current pipe rectangle width;

Top Y of current pipe rectangle=0; and

Bottom Y of current pipe rectangle=height of display device 128.

In step 269, a determination is made as to whether the current pipe rectangle is the last pipe rectangle. If the current pipe rectangle is not the last pipe rectangle then in step 271, the X distribution value is updated for use in generating coordinate values for the next pipe rectangle. Preferably, the X distribution value is incremented by the current pipe rectangle width. The process starting at step 267 is then executed for the next pipe rectangle.

If in step 269, it is determined that the current pipe rectangle is the last pipe rectangle, then the process starting at step 261 is executed.

If the determined orientation of the pipe rectangles is Horizontal, then the process starting at step 273 is executed. In step 273, a determination is made as to whether the user has specified a distribution for the pipe rectangles. If the user has specified a distribution for the pipe rectangles, then in step 275, a Y distribution value is set to zero. In step 277, a current pipe rectangle height parameter is set. Preferably, the current pipe rectangle height parameter is calculated using the following formula:

> Current pipe rectangle height=height of region of interest*percentage distribution for current pipe rectangle.

In step 279, coordinate values for the current pipe rectangle are calculated. The coordinate values are preferably calculated using the following formulas:

> Top $Y$ of current pipe rectangle=Top $Y$ of region of interest+$Y$ distribution, for all pipe rectangles other than the first pipe rectangle;
>
> Top Y of current pipe rectangle=0, if the current pipe rectangle is the first pipe rectangle;
>
> Bottom $Y$ of current pipe rectangle=Top $Y$ of current pipe rectangle+current pipe rectangle height;
>
> Left X of current pipe rectangle=0; and
>
> Right X of current pipe rectangle=width of display device 128.

In step 281, a determination is made as to whether the current pipe rectangle is the last pipe rectangle. If the current pipe rectangle is not the last pipe rectangle then in step 283, the Y distribution value is updated for use in generating coordinate values for the next pipe rectangle. Preferably, the Y distribution value is incremented by the current pipe rectangle height. The process starting at step 277 is then executed for the next pipe rectangle.

If in step 281, it is determined that the current pipe rectangle is the last pipe rectangle, then in step 285 the bottom Y value for the current pipe rectangle is modified to be equal to the height of display device 128. The process starting at step 248 is then executed.

If in step 273, it is determined that the user has not specified a distribution for the pipe rectangles, then in step 287, a Y distribution value is set to zero. In step 289, a current pipe rectangle height parameter is set. Preferably, the current pipe rectangle height parameter is calculated using the following formula:

> Current pipe rectangle height=height of region of interest/number of non-overlapping pipe rectangles.

In step 291, coordinate values for the current pipe rectangle are calculated. The coordinate values are preferably calculated using the following formulas:

> Top $Y$ of current pipe rectangle=Top $Y$ of region of interest+$Y$ distribution, for all pipe rectangles other than the first pipe rectangle;
>
> Top Y of current pipe rectangle=0, if the current pipe rectangle is the first pipe rectangle;
>
> Bottom $Y$ of current pipe rectangle=Top $Y$ of current pipe rectangle+current pipe rectangle height;
>
> Left X of current pipe rectangle=0; and
>
> Right X of current pipe rectangle=width of display device 128.

In step 293, a determination is made as to whether the current pipe rectangle is the last pipe rectangle. If the current pipe rectangle is not the last pipe rectangle then in step 295, the Y distribution value is updated for use in generating coordinate values for the next pipe rectangle. Preferably, the Y distribution value is incremented by the current pipe rectangle height. The process starting at step 291 is then executed for the next pipe rectangle.

If in step 293, it is determined that the current pipe rectangle is the last pipe rectangle, then the process starting at step 285 is executed.

If the determined orientation of the pipe rectangles is Grid, then the process starting at step 297 is executed. In step 297, a determination is made as to whether the user has specified a distribution for the pipe rectangles. If the user has specified a distribution for the pipe rectangles, then in step 299, an X distribution value is set to zero and a Y distribution value is set to zero. In step 301, a current pipe rectangle width parameter and a current pipe rectangle height parameter are set. Preferably, the current pipe rectangle width parameter is calculated using the following formula:

> Current pipe rectangle width=width of region of interest*percentage distribution for current pipe rectangle.

Preferably, the current pipe rectangle height parameter is calculated using the following formula:

> Current pipe rectangle height=height of region of interest*percentage distribution for current pipe rectangle.

In step 303, coordinate values for the current pipe rectangle are calculated. The coordinate values are preferably calculated using the following formulas:

> Left $X$ of current pipe rectangle=Left $X$ of region of interest+$X$ distribution, for all pipe rectangles other than the first pipe rectangle;
>
> Left X of current pipe rectangle=0, if the current pipe rectangle is the first pipe rectangle;
>
> Right $X$ of current pipe rectangle=Left $X$ of current pipe rectangle+current pipe rectangle width;
>
> Top $Y$ of current pipe rectangle=Top $Y$ of region of interest+$Y$ distribution, for all pipe rectangles other than the first pipe rectangle;
>
> Top Y of current pipe rectangle=0, if the current pipe rectangle is the first pipe rectangle; and
>
> Bottom $Y$ of current pipe rectangle=Top $Y$ of current pipe rectangle+current pipe rectangle height.

In step 305, a determination is made as to whether the current pipe rectangle is the last pipe rectangle in the current row of pipe rectangles. If the current pipe rectangle is not the last pipe rectangle in the current row of pipe rectangles, then in step 307, the X distribution value is updated for use in generating coordinate values for the next pipe rectangle. Preferably, the X distribution value is incremented by the current pipe rectangle width. The process starting at step 301 is then executed for the next pipe rectangle.

If in step 305, it is determined that the current pipe rectangle is the last pipe rectangle in the current row of pipe rectangles, then in step 309 the right X value for the current pipe rectangle is modified to be equal to the width of display device 128. In step 311, a determination is made as to whether the current pipe rectangle is the last pipe rectangle. If the current pipe rectangle is not the last pipe rectangle, then in step 313, the Y distribution value is updated for use in generating coordinate values for the next pipe rectangle. Preferably, the Y distribution value is incremented by the current pipe rectangle height. The process starting at step 301 is then executed for the next pipe rectangle.

If the current pipe rectangle is the last pipe rectangle, then the process starting at step 248 is executed.

If in step 297, it is determined that the user has not specified a distribution for the pipe rectangles, then in step 315, an X distribution value is set to zero and a Y distribution value is set to zero. In step 317, a current pipe rectangle width parameter and a current pipe rectangle height parameter are set. Preferably, the current pipe rectangle width parameter is calculated using the following formula:

> Current pipe rectangle width=width of region of interest/number of non-overlapping pipe rectangles.

Preferably, the current pipe rectangle height parameter is calculated using the following formula:

> Current pipe rectangle height=height of region of interest/number of non-overlapping pipe rectangle.

In step 319, coordinate values for the current pipe rectangle are calculated.

The coordinate values are preferably calculated using the following formulas:

> Left $X$ of current pipe rectangle=Left $X$ of region of interest+$X$ distribution, for all pipe rectangles other than the first pipe rectangle;
>
> Left X of current pipe rectangle=0, if the current pipe rectangle is the first pipe rectangle;
>
> Right $X$ of current pipe rectangle=Left $X$ of current pipe rectangle+current pipe rectangle width;
>
> Top $Y$ of current pipe rectangle=Top $Y$ of region of interest+$Y$ distribution, for all pipe rectangles other than the first pipe rectangle;
>
> Top Y of current pipe rectangle=0, if the current pipe rectangle is the first pipe rectangle; and
>
> Bottom $Y$ of current pipe rectangle=Top $Y$ of current pipe rectangle+current pipe rectangle height.

In step 321, a determination is made as to whether the current pipe rectangle is the last pipe rectangle in the current row of pipe rectangles. If the current pipe rectangle is not the last pipe rectangle in the current row of pipe rectangles, then in step 323, the X distribution value is updated for use in generating coordinate values for the next pipe rectangle. Preferably, the X distribution value is incremented by the current pipe rectangle width. The process starting at step 319 is then executed for the next pipe rectangle.

If in step 321, it is determined that the current pipe rectangle is the last pipe rectangle in the current row of pipe rectangles, then in step 325, the right X value for the current pipe rectangle is modified to be equal to the width of display device 128. In step 327, a determination is made as to whether the current pipe rectangle is the last pipe rectangle. If the current pipe rectangle is not the last pipe rectangle, then in step 329, the Y distribution value is updated for use in generating coordinate values for the next pipe rectangle. Preferably, the Y distribution value is incremented by the current pipe rectangle height. The process starting at step 319 is then executed for the next pipe rectangle.

If the current pipe rectangle is the last pipe rectangle, then the process starting at step 248 is executed.

Compositor 126 preferably comprises a controller card (not shown) coupled to a plurality of input cards (not shown) via a communication bus (not shown). FIG. 8 is a flowchart 260 of a method for programming the pipe rectangles into compositor 126 in accordance with an embodiment of the present invention. In step 284, a counter, i, is initialized preferably to minus one (−1). In step 286, a determination is made as to whether any more slave pipelines 106–112 should be programmed. If no more slave pipelines are to be programmed, then in step 287 pipe rectangles with the respective pipe rectangle boundary indicators are displayed on display device 128. Otherwise in step 288, the counter is incremented. In step 290, the pipe rectangle data for pipe rectangle i is packetized, preferably by inserting the data into a predetermined data structure. In step 292, the packetized data is transmitted to the slave pipeline corresponding to pipe rectangle i. In step 294, the controller card addresses an input card corresponding to the slave pipeline. In step 296, the controller card delivers the packet using the communication bus to the corresponding input card. In step 298, pipe rectangle information is stored in the corresponding input card. The process starting at step 286 may then be repeated. The correspondence between a pipe rectangle and a slave pipeline is re-programmable. For example, pipe rectangle number 1 may initially be programmed to correspond to slave pipeline 106. However, if slave pipeline 106 becomes unavailable, then pipe rectangle number 1 may be reprogrammed, preferably "on the fly", to correspond to a different slave pipeline, for example slave pipeline 108.

Figure 9:
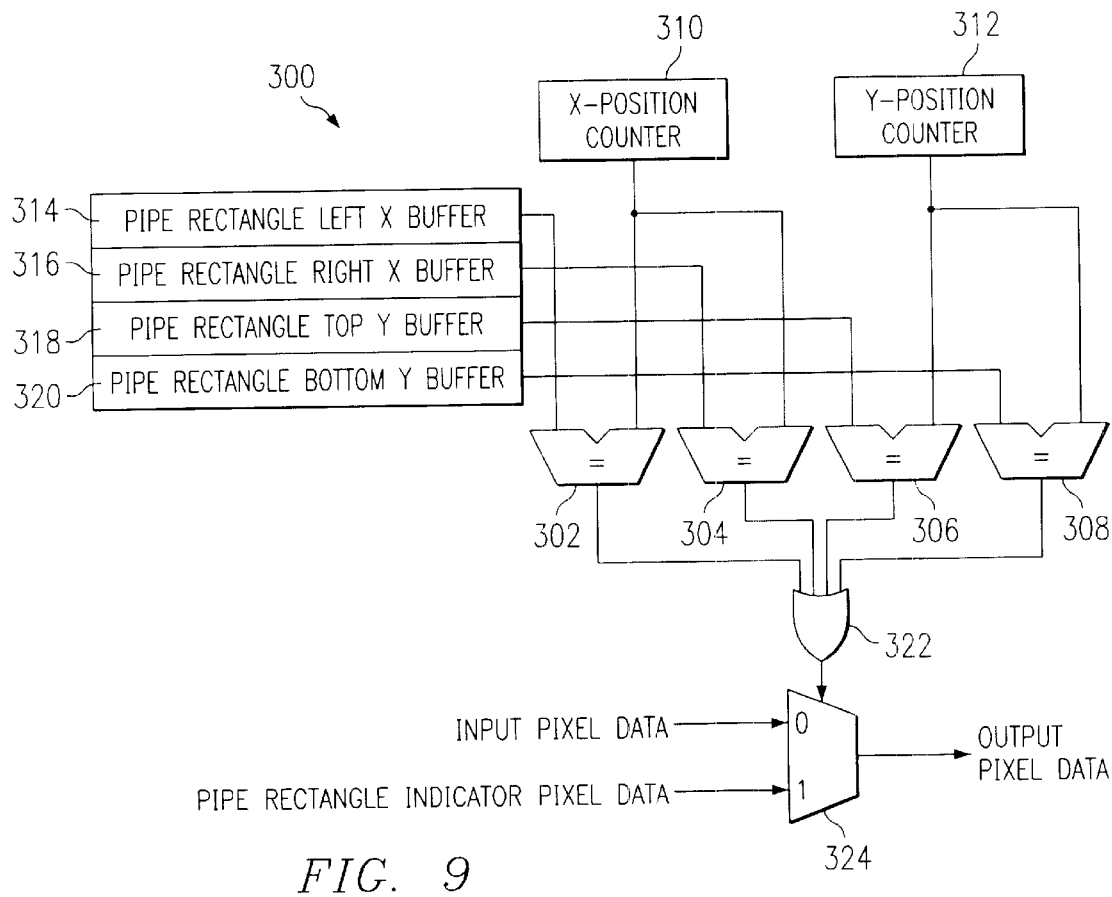
FIG. 9 is a schematic diagram of a display-enabling device for displaying the pipe rectangles on a display device of the computer graphical display system in accordance with an embodiment of the present invention.

FIG. 9 is a schematic diagram of a display-enabling device 300 for displaying the pipe rectangles on display device 128 in accordance with an embodiment of the present invention. Display-enabling device 300 is preferably part of compositor 126 (FIG. 1). However, the invention is not so limited and display-enabling device 300 may be separate from compositor 126. Display-enabling device 300 comprises a plurality, preferably four (one for each pipe rectangle boundary indicator of a pipe rectangle), of comparators 302, 304, 306, and 308. Compositor 126 of graphical display system 100 is constantly rendering the image on display device 128. Compositor 126 keeps track of the coordinate values for the current pixel being rendered. The x-coordinate value for the current pixel is stored in a x-position counter 310 and the y-coordinate value for the current pixel is stored in a y-position counter 312. The x-coordinate values for a left boundary indicator of the pipe rectangles is stored in a Pipe Rectangle Left X buffer 314, the x-coordinate values for a right boundary indicator of the pipe rectangles is stored in a Pipe Rectangle Right X buffer 316, the y-coordinate values for a top boundary indicator of the pipe rectangles is stored in a Pipe Rectangle top Y buffer 318, and the y-coordinate values for a bottom boundary indicator of the pipe rectangles is stored in a Pipe Rectangle bottom Y buffer 320.

Outputs of x-position counter 310 and Pipe Rectangle Left X buffer 314 connect to an input of comparator 302; outputs of x-position counter 310 and Pipe Rectangle Right X buffer 316 connect to an input of comparator 304; outputs of y-position counter 312 and Pipe Rectangle Top Y buffer 318 connect to an input of comparator 306; and outputs of y-position counter 312 and Pipe Rectangle Bottom Y buffer 320 connect to an input of comparator 308.

Display-enabling device 300 also comprises an OR gate 322 and a multiplexor 324. The output of comparators 302, 304, 306 and 308 connect to inputs of OR gate 322. The output of OR gate 322 connects to a control input of multiplexor 324. Multiplexor 324 is preferably a 2-to-1 multiplexor. Preferably, a first data input, for example a 0 input, of multiplexor 324 receives pixel data for the current pixel being rendered and a second data input, for example a 1 input, of multiplexor 324 receives pixel data for a pipe rectangle boundary indicator. Thus, when the output of OR gate 322 is zero, then output pixel data for the current pixel is equal to the input pixel data for the current pixel and when the output of OR gate 322 is one, then output pixel data for the current pixel is equal to the pipe rectangle boundary indicator pixel data.

The output of at least one of the comparators 302, 304, 306 and 308 and hence OR gate 322 is equal to 1 when at least one of the following conditions is true: i) the x-coordinate value of the current pixel matches the x-coordinate value for the left boundary indicator of any of the pipe rectangles; ii) the x-coordinate value of the current pixel matches the x-coordinate value for the right boundary indicator of any of the pipe rectangles; iii) the y-coordinate value of the current pixel matches the y-coordinate value for the top boundary indicator of any of the pipe rectangles; or iv) the y-coordinate value of the current pixel matches the y-coordinate value for the bottom boundary indicator of any of the pipe rectangles. In such a case, the output pixel data value is equal to the pipe rectangle boundary indicator pixel data value. If none of the above conditions is true, then the output pixel data value is equal to the input pixel data value. Thus, when the current pixel being rendered is on the boundary of a pipe rectangle, the pipe rectangle boundary indicator pixel data is displayed.

An advantage of the preferred embodiment of the present invention for automatically configuring graphics pipelines by tracking a region of interest is that the user does not have to repeatedly specify the configuration of the different pipelines. Once the user specifies the pipeline configuration relative to a region of interest, the pipeline configuration is automatically adjusted even if the region of interest is modified, for example by resizing or moving the region of interest.

There is a further desire for a system and method for dynamic load-balancing of graphics pipelines in the computer graphical display system. In the preferred embodiment this is accomplished by determining and analyzing the amount of time taken by the different graphics pipelines to render respective portions of an image assigned to them and automatically adjusting the respective portions of the image assigned to the different graphics pipelines.

Figure 10:
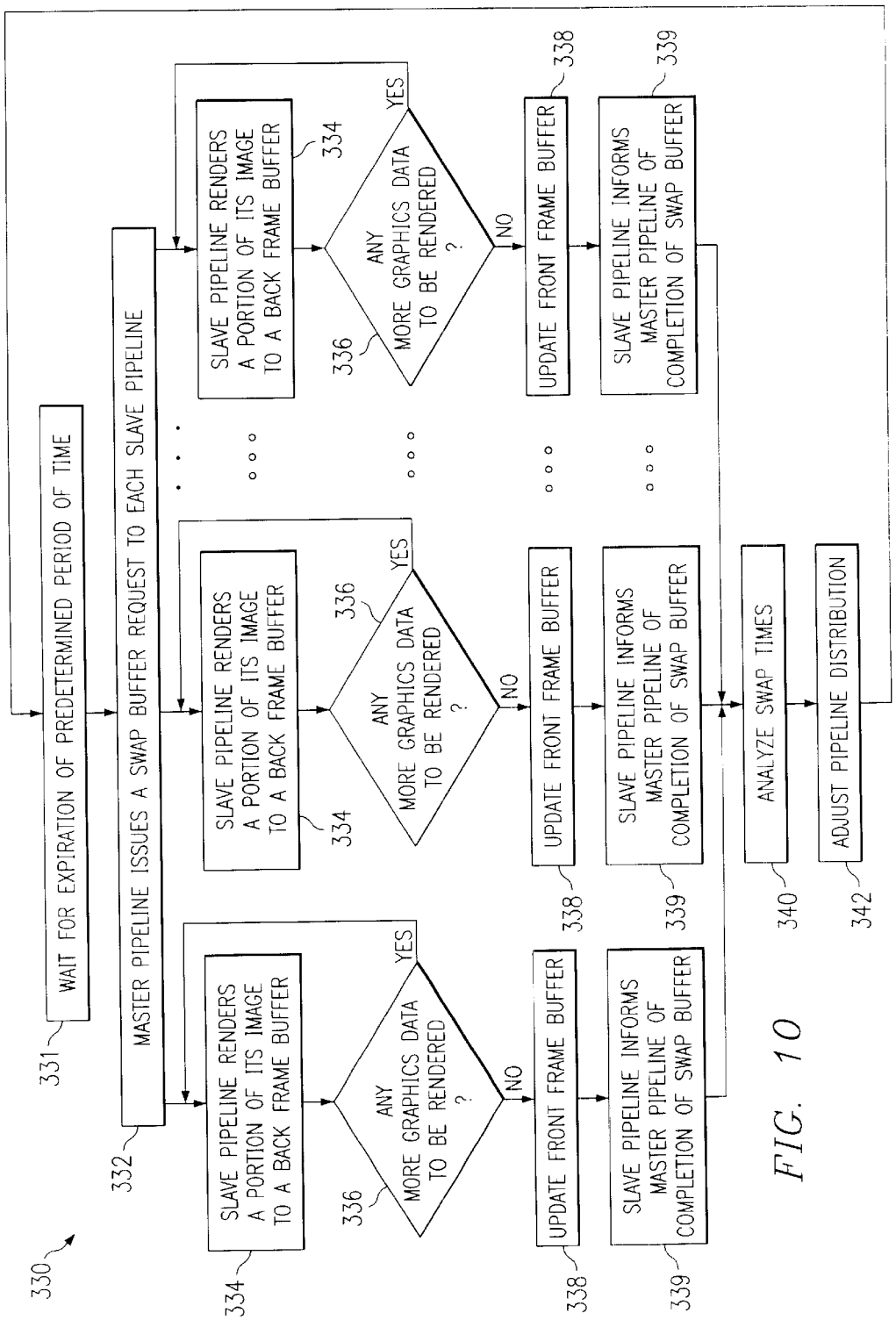
FIG. 10 is a flowchart of a method for dynamic load-balancing of graphics pipelines in a computer graphical display system in accordance with an embodiment of the present invention.

FIG. 10 is a flowchart 330 of a method for dynamic load-balancing of graphics pipelines in system 100. In step 331, master pipeline 104 waits for expiration of a predetermined period of time. Master pipeline 104 issues a swap buffer request periodically in order to balance the workload of slave pipelines 106–112. After expiration of the predetermined period of time, in step 332, master pipeline 104 issues a swap buffer request to each slave pipeline 106–112. A swap buffer request is a request to a slave pipeline to render its assigned portion of the image to be displayed on display device 128 to an associated back frame buffer (not shown) and to update a front frame buffer (not shown) associated with the back frame buffer in order to facilitate displaying of the newly rendered image. The back frame buffer and the front frame buffer are preferably part of display device 128.

In step 334, each slave pipeline 106–112 renders the portion of the image assigned to it and stores the graphics data in the back frame buffer associated with the respective slave pipeline. In step 336, each slave pipeline 106–112 makes a determination as to whether any more graphics data is to be rendered by the respective slave pipeline. If additional graphics data is to be rendered then the process starting at step 334 is repeated. Otherwise, execution proceeds to step 338. In step 338, each of the slave pipelines updates the front frame buffer associated with it to facilitate displaying of the newly rendered image on display device 128. In the preferred embodiment, the front frame buffer is updated by changing a front frame buffer pointer to point to the back frame buffer. A back frame buffer pointer may be changed to point to the front frame buffer. However, if desired, in alternative embodiments in order to update the front frame buffer, the data from the back frame buffer may be copied into the front frame buffer. However, the process of copying data from the back frame buffer to the front frame buffer takes longer. In step 339, each slave pipeline informs master pipeline 104 of completion of the swap buffer request. It is to be noted that each of the slave pipelines 106–112 performs steps 334 to 339 in parallel.

Master pipeline 104 waits for each slave pipeline to finish updating its respective front frame buffer before initiating step 340. In step 340, the swap times for the different slave pipelines 106–112 are analyzed, preferably by master pipeline 104. Swap time is preferably the elapsed time between master pipeline 104 issuing the swap buffer request and master pipeline 104 being informed of the completion of the swap buffer request. For example, in the flowchart of FIG. 10, swap time for each slave pipeline is the time taken by each slave pipeline to execute steps 334 through 339. A system and method for analyzing swap times is described in more detail herein especially with reference to FIG. 11.

In step 342, the distribution of slave pipelines 106–112 is adjusted based at least in part on the analysis of swap times performed in step 340. A system and method for adjusting pipeline distribution is described in more detail herein especially with reference to FIG. 12. The process of dynamic load-balancing as depicted in FIG. 10 may be repeated periodically. Thus, in the preferred embodiment, load-balancing is achieved by analyzing the time taken by each slave pipeline to render its assigned portion of the image and then adjusting the pipeline distribution.

Figure 11:
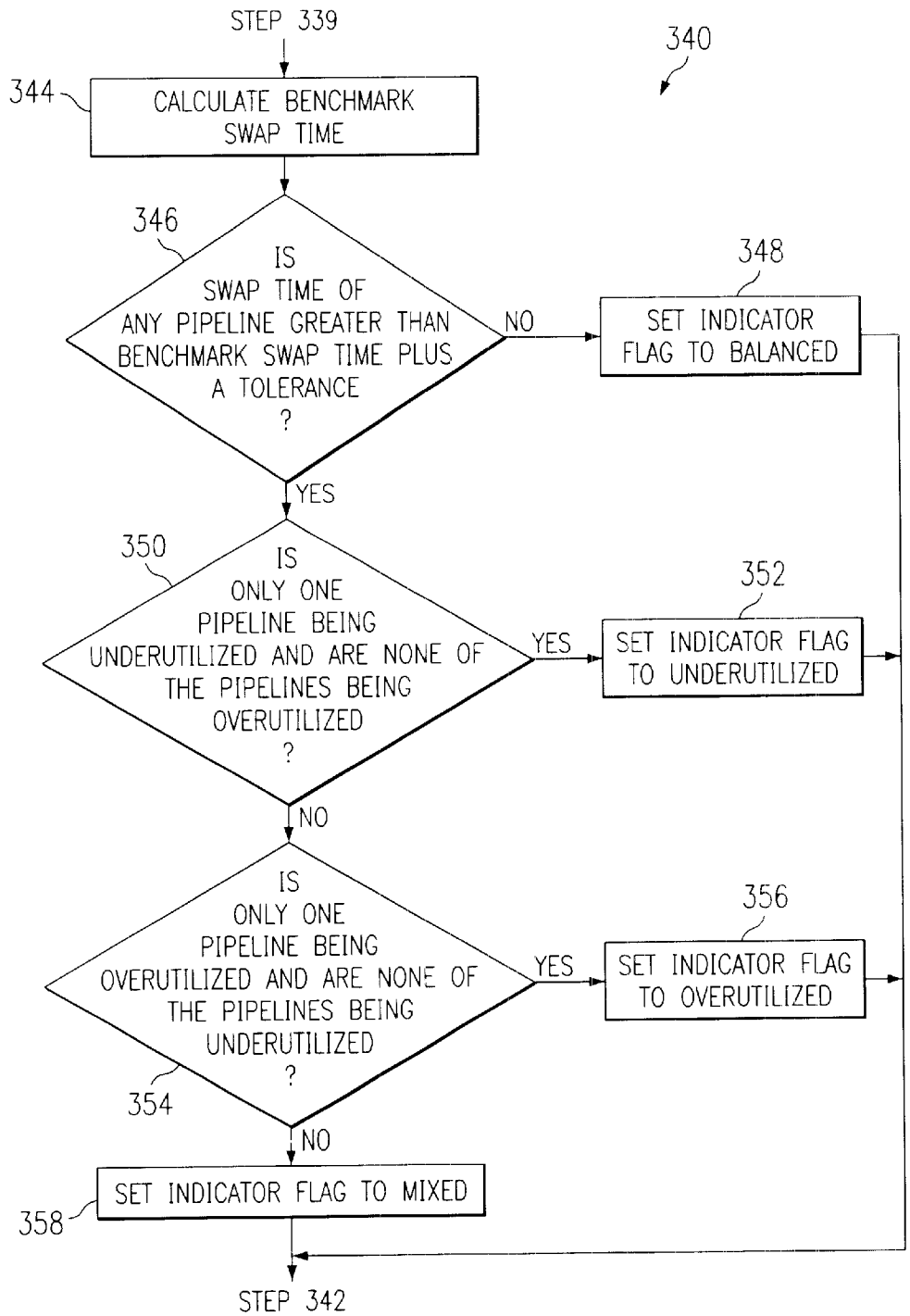
FIG. 11 is a flowchart of a method for analyzing swap times in accordance with an embodiment of the present invention.

FIG. 11 is a flowchart 340 of a method for analyzing swap times in accordance with an embodiment of the present invention. In step 344, a benchmark swap time is calculated. Preferably, the benchmark swap time is the average swap time of the plurality of slave pipelines 106–112. However, if desired, other methods for calculating the benchmark swap time may be used. For example, the benchmark swap time may be the median swap time of the plurality of slave pipelines 106–112. In step 346, a determination is made as to whether the swap time Of any of the slave pipelines 106–112 is greater than the benchmark swap time plus a tolerance. The tolerance may be a user specified value. If the swap time of none of the slave pipelines 106–112 is greater than the benchmark swap time plus the tolerance, that indicates that the operation of slave pipelines 106–112 is optimal. In such a case, an indicator flag which indicates the state of slave pipelines is set to a "Balanced" state (step 348) and the process starting at step 342 of FIG. 10 is executed.

If the swap time of any of the slave pipelines 106–112 is greater than the benchmark swap time plus the tolerance, then in step 350 a determination is made as to whether only one slave pipeline is being underutilized and none of the slave pipelines are being overutilized. A slave pipeline is underutilized if its swap time is less than the benchmark swap time plus a tolerance. A slave pipeline is overutilized if its swap time is greater than the benchmark swap time plus a tolerance. The tolerance values used in this step may be the same or different from the tolerance value used in step 346. Moreover, the two tolerance values used in step 350 may be the same or different. If only one slave pipeline is being underutilized and none of the slave pipelines are being overutilized, then the indicator flag is set to an "Underutilized" state (step 352). The process starting at step 342 of FIG. 10 may then be executed.

Execution proceeds to step 354 if in step 350 one of the following conditions is true: i) none of the slave pipelines are being underutilized, ii) more than one slave pipeline is being underutilized, or iii) at least one slave pipeline is being overutilized.

In step 354 a determination is made as to whether only one slave pipeline is being overutilized and none of the slave pipelines are being underutilized. If only one slave pipeline is being overutilized and none of the slave pipelines are being underutilized, then the indicator flag is set to an "Overutilized" state (step 356). The process starting at step 342 of FIG. 10 may then be executed.

Execution proceeds to step 358 if in step 354 one of the following conditions is true: i) more than one slave pipelines are being underutilized; ii) more than one slave pipeline's are being overutilized; or iii) at least one slave pipeline is being underutilized and at least one slave pipeline is being overutilized. In step 358, the indicator flag is set to a "Mixed" state. The process starting at step 342 of FIG. 10 may then be executed.

Table I shows the status of the indicator flag in a computer graphical display system with 4 slave pipelines under different conditions.

on a current orientation of the pipe rectangles. Table II shows the guidelines that are preferably used to select a desired new orientation for the pipe rectangles.

TABLE II

| CURRENT ORIENTATION | NEW ORIENTATION |
|---|---|
| 1. Vertical | Grid centered over the region of interest |
| 2. Horizontal | Grid centered over the region of interest |
| 3. Window pane mode | Grid centered over the region of interest |
| 4. Grid (with more than 4 slave pipelines) | Window pane |
| 5. Grid (with 4 or fewer slave pipelines) | Vertical |

The process starting at step 372 is then executed. The process starting at step 372 is described in greater detail hereinafter.

If in step 362, it is determined that the indicator flag is not set to the "Mixed" state, then in step 366, a determination is made as to whether the indicator flag is set to an "Overutilized" state. An indicator flag set to an "Overutilized" state indicates that a single slave pipeline is being overutilized. Thus, if the indicator flag is set to an "Overutilized" state, then in step 368, a new distribution for the pipe rectangles is selected. Preferably, the new distribution is such that the workload of the overutilized slave pipeline is reduced and the workload for the remaining slave pipelines is increased. The workload of the overutilized slave pipeline is preferably reduced by a predefined percentage and distributed evenly among the remaining slave pipelines. In the preferred embodiment, the predefined percentage is the same as the percentage by which the swap time of the overutilized slave pipeline exceeds the benchmark swap time plus the tolerance. The process starting at step 372 is then executed.

TABLE I

| | Pipeline #1 | Pipeline #2 | Pipeline #3 | Pipeline #4 | Indicator Flag |
|---|---|---|---|---|---|
| 1. | Underutilized | Benchmark + tolerance | Benchmark + tolerance | Benchmark + tolerance | Underutilized |
| 2. | Underutilized | Underutilized | Benchmark + tolerance | Benchmark + tolerance | Mixed |
| 3. | Overutilized | Benchmark + tolerance | Benchmark + tolerance | Benchmark + tolerance | Overutilized |
| 4. | Overutilized | Overutilized | Benchmark + tolerance | Benchmark + tolerance | Mixed |
| 5. | Underutilized | Underutilized | Overutilized | Overutilized | Mixed |
| 6. | Underutilized | Overutilized | Overutilized | Overutilized | Mixed |
| 7. | Overutilized | Underutilized | Underutilized | Underutilized | Mixed |
| 8. | Overutilized | Underutilized | Benchmark + tolerance | Benchmark + tolerance | Mixed |

Figure 12:
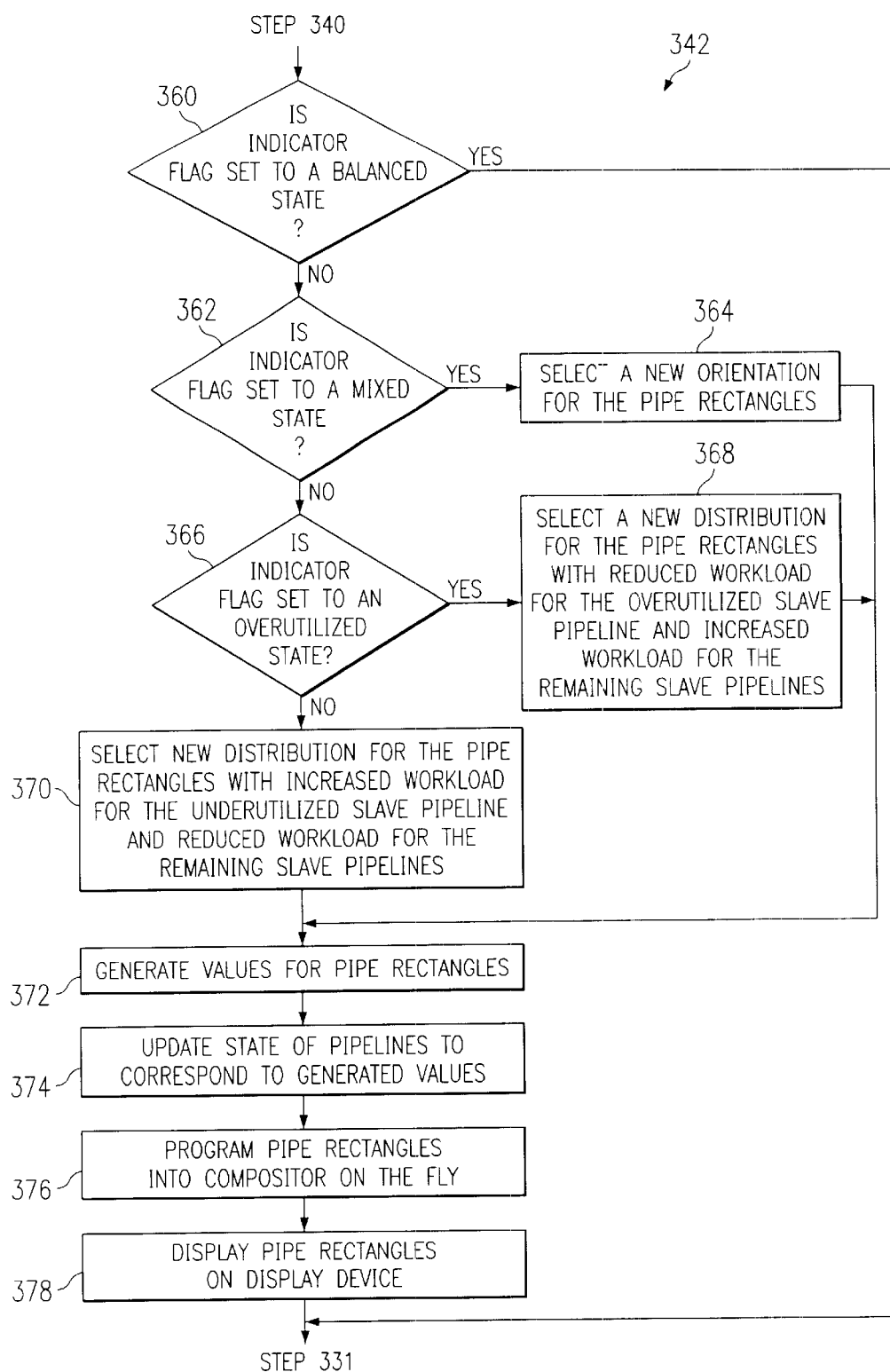
FIG. 12 is a flowchart of a method for adjusting pipeline distribution in accordance with an embodiment of the present invention.

FIG. 12 is a flowchart 342 of a method for adjusting pipeline distribution in accordance with an embodiment of the present invention. In step 360, a determination is made as to whether the indicator flag is set to a "Balanced" state. If the indicator flag is set to a "Balanced" state, then the process starting at step 331 of FIG. 10 maybe executed.

If the indicator flag is not set to a "Balanced" state, then in step 362, a determination is made as to whether the indicator flag is set to a "Mixed" state. If the indicator flag is set to a "Mixed" state, then in step 364, a new orientation is selected for the pipe rectangles. Thus, for example, if more than one slave pipeline is overutilized, then a new orientation is selected for the pipe rectangles to make better utilization of slave pipelines 106–112. The selection of the new orientation of the pipe rectangles is based at least in part The indicator flag is determined to be set to the "Underutilized" state, if in step 366, it is determined that the indicator flag is not set to the "Overutilized" state. An indicator flag set to an "Underutilized" state indicates that a single slave pipeline is being underutilized. Thus, if the indicator flag is set to an "Underutilized" state, then in step 370, a new distribution for the pipe rectangles is selected. Preferably, the new distribution is such that the workload of the underutilized slave pipeline is increased and the workload for the remaining slave pipelines is reduced evenly. The workload of the underutilized slave pipeline is preferably increased by a predefined percentage and the workload of the remaining slave pipelines is reduced evenly. In the preferred embodiment, the predefined percentage is the same as the percentage by which the swap time of the underutilized slave pipeline is less than the benchmark swap time plus the tolerance. The process starting at step 372 is then executed.

In step 372, values for pipe rectangles are generated, preferably by GLX layer 172, based at least in part on the new configuration of the pipe rectangles. A method for generating values for pipe rectangles is described in more detail herein especially with reference to FIGS. 7A–7D.

In step 374, the state of the pipelines is updated to correspond to the generated pipe rectangle values. In step 374, GLX layer 172 updates the state of each of the pipelines with the generated pipe rectangle values indicating the orientation and distribution for the respective pipelines.

In step 376, the pipe rectangles are programmed into compositor 126, preferably on the fly. GLX layer 172 converts the pipe rectangle data in a format suitable for X server 162. GLX layer 172 then transmits the pipe rectangle data to X server 162. X server 162 preferably programs compositor 126 so that compositor 126 is aware of the pipe rectangles associated with different pipelines. A system and method for programming the pipe rectangles into compositor 126 is described in more detail herein especially with reference to FIG. 8.

In step 378, pipe rectangles with the respective pipe rectangle boundary indicators are displayed on display device 128. The pipe rectangles are displayed on display device 128 preferably by X server 162. A system for displaying the pipe rectangles on display device 128 is described in more detail herein especially with reference to FIG. 9. Once the pipe rectangles are displayed on display device 128, the process starting at step 331 (FIG. 10) may be repeated.

An advantage of the preferred embodiment of the present invention for dynamic load-balancing is that the workload of the different slave pipelines is dynamically adjusted such that each slave pipeline takes substantially the same amount of time to render its allocated portion of the image. Assuming slave pipelines of same processing speed, the different slave pipelines would render substantially equal portions of the image. Thus, a bottleneck that may otherwise be caused due to unequal distribution of workloads to slave pipelines of substantially the same processing speed may be avoided.

What is claimed is:

1. A method for automatically configuring a plurality of graphics pipelines in a computer graphical display system, comprising:
   receiving updated definitional information on a selected region of interest of a display device of said computer graphical display system in response to a change in definition of said selected region of interest; and
   automatically configuring said plurality of graphics pipelines relative to said selected region of interest based at least in part on said updated definitional information.

2. The method of claim 1, further comprising receiving definitional information on said selected region of interest from a user prior to said receiving updated definitional information step.

3. The method of claim 1, further comprising receiving graphics pipeline configuration information relative to said selected region of interest for automatically configuring said plurality of graphics pipelines relative to said selected region of interest.

4. The method of claim 3, further comprising storing said graphics pipeline configuration information.

5. The method of claim 3, wherein said receiving graphics pipeline configuration information comprises receiving graphics pipeline configuration information comprising at least one parameter for a plurality of pipe rectangles of said computer graphical display system, each of said plurality of pipe rectangles being associated with at least one of said plurality of graphics pipelines.

6. The method of claim 5, further comprising updating a compositor of said computer graphical display system in real-time based at least in part on said at least one parameter.

7. The method of claim 5, wherein said at least one parameter is selected from the group consisting of an orientation parameter and a distribution parameter.

8. The method of claim 5, wherein said automatically configuring step comprises generating coordinate values for each of said plurality of pipe rectangles based at least in part on said at least one parameter and at least in part on a screen size of said display device.

9. The method of claim 3, wherein said automatically configuring step comprises generating coordinate values for a plurality of pipe rectangles of said computer graphical display system, each of said plurality of pipe rectangles being associated with at least one of said plurality of graphics pipelines, said coordinate values being generated based at least in part on said graphics pipeline configuration information.

10. The method of claim 9, further comprising updating a state of said plurality of graphics pipelines based at least in part on said generated coordinate values.

11. The method of claim 9, further comprising updating a compositor of said computer graphical display system with said generated coordinate values.

12. The method of claim 1, further comprising retrieving graphics pipeline configuration information relative to said selected region of interest for automatically configuring said plurality of graphics pipelines in response to receiving said updated definitional information.

13. The method of claim 1, wherein said receiving updated definitional information step comprises receiving updated definitional information selected from the group consisting of a location of said selected region of interest and dimensions of said selected region of interest.

14. The method of claim 1, further comprising displaying a plurality of pipe rectangles on said display device, at least one of said plurality of pipe rectangles being associated with at least one of said plurality of graphics pipelines.

15. A method for automatically configuring a plurality of graphics pipelines in a computer graphical display system, comprising:
   receiving graphics pipeline configuration information relative to a selected region of interest of a display device of said computer graphical display system for configuring said plurality of graphics pipelines relative to said selected region of interest;
   receiving updated definitional information on said selected region of interest in response to a change in definition of said selected region of interest; and
   automatically configuring said plurality of graphics pipelines relative to said selected region of interest based at least in part on said graphics pipeline configuration information in response to said change in definition of said selected region of interest.

16. The method of claim 15, further comprising receiving definitional information on said selected region of interest.

17. The method of claim 15, further comprising:
   storing said graphics pipeline configuration information; and
   retrieving, in response to said change in definition of said selected region of interest, said graphics pipeline configuration information.

18. The method of claim 15, wherein said automatically configuring step comprises generating coordinate values for a plurality of pipe rectangles of said computer graphical display system, each of said plurality of pipe rectangles being associated with at least one of said plurality of graphics pipelines, said coordinate values being generated based at least in part on said graphics pipeline configuration information.

19. The method of claim 18, further comprising updating a state of said plurality of graphics pipelines based at least in part on said generated coordinate values.

20. The method of claim 18, further comprising updating a compositor of said computer graphical display system with said generated coordinate values.

21. The method of claim 15, further comprising displaying a plurality of pipe rectangles on said display device, each of said plurality of pipe rectangles being associated with at least one of said plurality of graphics pipelines.

22. A system for automatically configuring a plurality of graphics pipelines in a computer graphical display system, comprising:
means for receiving updated definitional information on a selected region of interest of a display device of said computer graphical display system in response to a change in definition of said selected region of interest; and
means for automatically configuring said plurality of graphics pipelines relative to said selected region of interest based at least in part on said updated definitional information.

23. A system for automatically configuring a plurality of graphics pipelines in a computer graphical display system, comprising:
means for providing updated information on a selected region of interest of a display device of said computer graphical display system, said means for providing operable to provide said updated information in response to detecting a change in said selected region of interest; and
means for receiving said updated information, said means for receiving further operable to automatically configure said plurality of graphics pipelines relative to said selected region of interest based at least in part on said updated information.

24. The system of claim 23, wherein said updated information comprises information selected from the group consisting of a location of said selected region of interest and dimensions of said selected region of interest.

25. A method for dynamic load-balancing of a plurality of graphics pipelines in a computer graphical display system, comprising:
analyzing the time taken by each of said plurality of graphics pipelines to render their respective portions of a graphics image; and
automatically adjusting said respective portions of said graphics image of said plurality of graphics pipelines based at least in part on said analysis of the time taken by each of said plurality of graphics pipelines to render said respective portions of said graphics image, wherein said automatically adjusting step comprises selecting a new orientation for a plurality of pipe rectangles of said computer graphical display system, each of said plurality of pipe rectangles being associated with at least one of said plurality of graphics pipelines.

26. The method of claim 25, wherein said selecting said new orientation is based at least in part on a current orientation of said plurality of pipe rectangles.

27. A method for dynamic load-balancing of a plurality of graphics pipelines in a computer graphical display system, comprising:
analyzing the time taken by each of said plurality of graphics pipelines to render their respective portions of a graphics image; and
automatically adjusting said respective portions of said graphics image of said plurality of graphics pipelines based at least in part on said analysis of the time taken by each of said plurality of graphics pipelines to render said respective portions of said graphics image, wherein said automatically adjusting step comprises selecting, in response to more than one of said plurality of graphics pipelines being underutilized, a new orientation for a plurality of pipe rectangles of said computer graphical display system, each of said plurality of pipe rectangles being associated with at least one of said plurality of graphics pipelines.

28. A method for dynamic load-balancing of a plurality of graphics pipelines in a computer graphical display system, comprising:
analyzing the time taken by each of said plurality of graphics pipelines to render their respective portions of a graphics image; and
automatically adjusting said respective portions of said graphics image of said plurality of graphics pipelines based at least in part on said analysis of the time taken by each of said plurality of graphics pipelines to render said respective portions of said graphics image, wherein said automatically adjusting step comprises selecting, in response to more than one of said plurality of graphics pipelines being overutilized, a new orientation for a plurality of pipe rectangles of said computer graphical display system, each of said plurality of pipe rectangles being associated with at least one of said plurality of graphics pipelines.

29. A method for dynamic load-balancing of a plurality of graphics pipelines in a computer graphical display system, comprising:
analyzing the time taken by each of said plurality of graphics pipelines to render their respective portions of a graphics image; and
automatically adjusting said respective portions of said graphics image of said plurality of graphics pipelines based at least in part on said analysis of the time taken by each of said plurality of graphics pipelines to render said respective portions of said graphics image, wherein said automatically adjusting step comprises selecting, in response to at least one of said plurality of graphics pipelines being underutilized and at least one of said plurality of graphics pipelines being overutilized, a new orientation for a plurality of pipe rectangles of said computer graphical display system, each of said plurality of pipe rectangles being associated with at least one of said plurality of graphics pipelines.

30. A method for dynamic load-balancing of a plurality of graphics pipelines in a computer graphical display system, comprising:
analyzing the time taken by each of said plurality of graphics pipelines to render their respective portions of a graphics image; and
automatically adjusting said respective portions of said graphics image of said plurality of graphics pipelines based at least in part on said analysis of the time taken by each of said plurality of graphics pipelines to render said respective portions of said graphics image, wherein said automatically adjusting step comprises selecting a new distribution for a plurality of pipe rectangles of said computer graphical display system, each of said plurality of pipe rectangles being associated with at least one of said plurality of graphics pipelines.

31. The method of claim 30, wherein said selecting a new distribution step comprises selecting said new distribution for said plurality of pipe rectangles to reduce a workload of a first graphics pipeline of said plurality of graphics pipelines, in response to only said first graphics pipeline being overutilized.

32. The method of claim 31, wherein said selecting a new distribution step further comprises selecting said new distribution for said plurality of pipe rectangles to evenly increase a workload of each of the remaining graphics pipelines.

33. The method of claim 30, wherein said selecting a new distribution step comprises selecting said new distribution for said plurality of pipe rectangles to increase a workload of a first graphics pipeline of said plurality of graphics pipelines, in response to only said first graphics pipeline being underutilized.

34. The method of claim 33, wherein said selecting a new distribution step further comprises selecting said new distribution for said plurality of pipe rectangles to evenly reduce a workload of each of the remaining graphics pipelines.

35. The method of claim 30, wherein said analyzing step comprises calculating a benchmark swap time.

36. A method for dynamic load-balancing of a plurality of graphics pipelines in a computer graphical display system, comprising:

periodically issuing a swap buffer request to each of said plurality of graphics pipelines simultaneously;

analyzing the time taken by each of said plurality of graphics pipelines to complete said swap buffer request; and automatically adjusting a configuration of said plurality of graphics pipelines based at least in part on said analysis of the time taken by each of said plurality of graphics pipelines to complete said swap buffer request.

37. The method of claim 36, wherein said analyzing step comprises calculating a benchmark swap time.

38. The method of claim 37, wherein said analyzing step further comprises setting an indicator flag to a balanced state, in response to the time taken by each of said plurality of graphics pipelines to complete said swap buffer request being not greater than said benchmark swap time plus a predetermined tolerance.

39. The method of claim 37, wherein said analyzing step further comprises setting an indicator flag to an underutilized state, in response to the time taken by only one of said graphics pipeline to complete said swap buffer request being less than said benchmark swap time plus a first predetermined tolerance and the time taken by each of the remaining ones of said plurality of graphics pipelines to complete said swap buffer request being not greater than said benchmark swap time plus a second predetermined tolerance.

40. The method of claim 37, wherein said analyzing step further comprises setting an indicator flag to an overutilized state, in response to the time taken by only one of said graphics pipeline to complete said swap buffer request being greater than said benchmark swap time plus a first predetermined tolerance and the time taken by each of the remaining ones of said plurality of graphics pipelines to complete said swap buffer request being not less than said benchmark swap time plus a second predetermined tolerance.

41. A system for dynamic load-balancing of a plurality of graphics pipelines in a computer graphical display system, comprising:

means for analyzing the time taken by each of said plurality of graphics pipelines to render their respective portions of a graphics image;

means for automatically adjusting said respective portions of said graphics image of said plurality of graphics pipelines based at least in part on said analysis of the time taken by each of said plurality of graphics pipelines to render said respective portions of said graphics image; and means for setting an indicator flag to one of three states based at least in part on said analysis of said time taken by each of said plurality of graphics pipelines to render their respective portions of said graphics image.

* * * * *